(12) United States Patent
Koenck et al.

(10) Patent No.: US 7,510,121 B2
(45) Date of Patent: **\*Mar. 31, 2009**

(54) MULTI-LEVEL HIERARCHICAL RADIO-FREQUENCY COMMUNICATION SYSTEM

(75) Inventors: Steven E. Koenck, Cedar Rapids, IA (US); Alan G. Bunte, Cedar Rapids, IA (US); Keith K. Cargin, Jr., Cedar Rapids, IA (US); George E. Hanson, Cedar Rapids, IA (US); Ronald L. Mahany, Cedar Rapids, IA (US); Phillip Miller, Cedar Rapids, IA (US); Steven H. Salvay, Cedar Rapids, IA (US); Arvin D. Danielson, Solon, IA (US); Guy J. West, Cedar Rapids, IA (US)

(73) Assignee: Broadcom Corporation, Irvine, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/419,636

(22) Filed: May 22, 2006

(65) Prior Publication Data

US 2006/0233161 A1  Oct. 19, 2006

Related U.S. Application Data

(60) Continuation of application No. 11/345,113, filed on Jan. 31, 2006, which is a continuation of application No. 10/809,108, filed on Mar. 25, 2004, now Pat. No. 7,004,395, which is a continuation of application No. 09/467,255, filed on Dec. 20, 1999, now Pat. No. 6,749,122, which is a division of application No. 08/239,267, filed on May 6, 1994, now Pat. No. 6,006,100, which is a continuation of application No. 07/876,776, filed on Apr. 28, 1992, now abandoned, which is a continuation-in-part of application No. 07/558,895, filed on Jul. 25, 1990, now abandoned, which is a continuation-in-part of application No. 07/529,353, filed on May 25, 1990, now abandoned, said application No. 07/876,776 is a continuation-in-part of application No. 07/854,115, filed on Mar. 18, 1992, now abandoned.

(51) Int. Cl.
*G06K 7/10* (2006.01)

(52) U.S. Cl. .................................. 235/472; 235/462.45

(58) Field of Classification Search ............ 235/472.01, 235/472.02, 462.01, 462.25, 462.45; 455/422, 455/466
See application file for complete search history.

(56) References Cited

U.S. PATENT DOCUMENTS 2,731,622 A    1/1956   Doremus et al.

(Continued)

FOREIGN PATENT DOCUMENTS

AU    B-83262/91    8/1989

OTHER PUBLICATIONS

Respondent Qualcomm Incorporated's Notice Of Prior Art, with Exhibit B attached thereto.

(Continued)

*Primary Examiner*—Daniel St.Cyr
(74) *Attorney, Agent, or Firm*—McAndrews, Held & Malloy, Ltd.

(57) ABSTRACT

Portable measuring devices which communicate by low power transceivers through a communication controller with a printer device collect weight and size data on articles to be shipped. The collected weight and size data are combined with origin and destination data, and labels are printed bearing pertinent shipping and routing information in machine readable format. The labels are attached to the articles to be shipped and accompany the articles to their respective destinations. At transfer points the labels are read by scanner devices which also communicate by low power transceiver links with the communication controller. The wireless linking of the scanner devices promotes human safety by the absence of cords which could cause entanglement of an operator in mechanized conveying equipment. The communication controllers at each stage of the shipping process have the capability of transferring received and updated status information on the shipped articles to a central data station.

57 Claims, 9 Drawing Sheets

U.S. PATENT DOCUMENTS

| | | | |
|---|---|---|---|
| 2,932,729 | A | 4/1960 | Yamato et al. |
| 2,942,072 | A | 6/1960 | Cunningham |
| 2,987,615 | A | 6/1961 | Dimmer et al. |
| 3,366,880 | A | 1/1968 | Driver et al. |
| 3,387,212 | A | 6/1968 | Kaufman |
| 3,586,977 | A | 6/1971 | Lustig |
| 3,745,462 | A | 7/1973 | Trimble |
| 3,826,900 | A | 7/1974 | Moellering |
| 3,876,863 | A | 4/1975 | Boone |
| 3,906,166 | A * | 9/1975 | Cooper et al. ............... 455/437 |
| 3,908,088 | A | 9/1975 | Gutleber |
| 3,955,140 | A | 5/1976 | Stephens |
| 4,004,098 | A | 1/1977 | Shimasaki |
| 4,004,225 | A | 1/1977 | Ganssmantel |
| 4,025,734 | A | 5/1977 | Aloupis |
| 4,054,753 | A | 10/1977 | Kaul et al. |
| 4,116,237 | A | 9/1978 | Birch |
| 4,251,865 | A | 2/1981 | Moore et al. |
| 4,301,530 | A | 11/1981 | Gutleber |
| 4,367,378 | A | 1/1983 | Jordan |
| 4,415,065 | A | 11/1983 | Sandstedt |
| 4,418,277 | A | 11/1983 | Tremmel et al. |
| 4,460,120 | A | 7/1984 | Shepard et al. |
| 4,471,218 | A | 9/1984 | Culp |
| 4,481,382 | A | 11/1984 | Villa-Real |
| 4,491,966 | A | 1/1985 | Morcerf et al. |
| 4,513,447 | A | 4/1985 | Carson |
| 4,539,706 | A | 9/1985 | Mears et al. |
| 4,549,264 | A | 10/1985 | Carroll et al. |
| 4,549,293 | A | 10/1985 | Christian |
| 4,553,262 | A | 11/1985 | Coe |
| 4,606,044 | A | 8/1986 | Kudo |
| 4,627,107 | A | 12/1986 | Hofifeld et al. |
| 4,639,914 | A | 1/1987 | Winters |
| 4,659,878 | A | 4/1987 | Dinkins |
| 4,672,658 | A | 6/1987 | Kavehrad et al. |
| 4,677,655 | A | 6/1987 | Hashimoto |
| 4,677,657 | A | 6/1987 | Nagata et al. |
| 4,682,351 | A | 7/1987 | Makino |
| 4,697,243 | A | 9/1987 | Moore et al. |
| 4,700,375 | A | 10/1987 | Reed |
| 4,706,274 | A | 11/1987 | Baker et al. |
| 4,741,019 | A | 4/1988 | Takahashi |
| 4,745,632 | A | 5/1988 | Duffy |
| 4,773,032 | A | 9/1988 | Uehara et al. |
| 4,775,928 | A | 10/1988 | Kendall et al. |
| 4,789,983 | A | 12/1988 | Acampora et al. |
| 4,833,726 | A | 5/1989 | Shinoda et al. |
| 4,850,006 | A | 7/1989 | Sasaki et al. |
| 4,857,716 | A | 8/1989 | Gombrich et al. |
| 4,879,740 | A | 11/1989 | Nagashima et al. |
| 4,906,989 | A | 3/1990 | Kasugai |
| 4,916,441 | A | 4/1990 | Gombrich |
| 4,924,461 | A | 5/1990 | Amamiya et al. |
| 4,945,532 | A | 7/1990 | Hald |
| 4,955,038 | A | 9/1990 | Lee et al. |
| 4,972,456 | A | 11/1990 | Kaczmarek et al. |
| 4,989,230 | A | 1/1991 | Gillig |
| 5,006,699 | A | 4/1991 | Felkner et al. |
| 5,006,996 | A | 4/1991 | Nakamura et al. |
| 5,007,050 | A | 4/1991 | Kasparian et al. |
| 5,008,953 | A | 4/1991 | Dahlin et al. |
| 5,020,135 | A | 5/1991 | Kasparian et al. |
| 5,023,824 | A | 6/1991 | Chadima, Jr. et al. |
| 5,025,486 | A | 6/1991 | Klughart |
| 5,029,183 | A | 7/1991 | Tymes |
| 5,029,232 | A | 7/1991 | Nall |
| 5,031,098 | A | 7/1991 | Miller et al. |
| 5,042,082 | A | 8/1991 | Dahlin |
| 5,044,010 | A | 8/1991 | Frenkiel et al. |
| 5,046,066 | A | 9/1991 | Messenger |
| 5,054,052 | A * | 10/1991 | Nonami ...................... 455/574 |
| 5,090,054 | A | 2/1992 | Grilliot et al. |
| 5,103,448 | A | 4/1992 | Barnes et al. |
| 5,142,700 | A | 8/1992 | Reed |
| 5,157,187 | A | 10/1992 | Le et al. |
| 5,157,687 | A | 10/1992 | Tymes |
| 5,179,721 | A | 1/1993 | Comroe et al. |
| 5,187,646 | A | 2/1993 | Koch |
| 5,189,291 | A | 2/1993 | Siemiatkowski |
| 5,208,449 | A | 5/1993 | Eastman et al. |
| 5,218,187 | A | 6/1993 | Koenck et al. |
| 5,220,564 | A | 6/1993 | Tuch et al. |
| 5,220,678 | A | 6/1993 | Feei |
| 5,227,614 | A | 7/1993 | Danielson et al. |
| 5,239,622 | A | 8/1993 | Best et al. |
| 5,241,542 | A | 8/1993 | Natarajan et al. |
| 5,272,324 | A | 12/1993 | Blevins |
| 5,276,686 | A | 1/1994 | Ito |
| 5,276,918 | A | 1/1994 | Cornforth et al. |
| 5,289,378 | A | 2/1994 | Miller et al. |
| 5,295,154 | A | 3/1994 | Meier et al. |
| 5,335,356 | A | 8/1994 | Anderson |
| 5,339,316 | A | 8/1994 | Diepstraten |
| 5,349,678 | A | 9/1994 | Morris |
| 5,351,270 | A | 9/1994 | Graham et al. |
| 5,375,163 | A | 12/1994 | Kamimot et al. |
| 5,389,917 | A | 2/1995 | LaManna |
| 5,404,577 | A | 4/1995 | Zuckerman |
| 5,422,934 | A | 6/1995 | Massa |
| 5,457,629 | A | 10/1995 | Miller et al. |
| 5,465,207 | A | 11/1995 | Boatwright et al. |
| 5,602,854 | A | 2/1997 | Luse et al. |
| 5,657,317 | A | 8/1997 | Mahany et al. |
| 5,682,379 | A | 10/1997 | Mahany et al. |
| 5,748,619 | A | 5/1998 | Meier |
| 5,797,099 | A | 8/1998 | Ejzak et al. |
| 6,006,100 | A | 12/1999 | Koenck et al. |
| 6,359,872 | B1 | 3/2002 | Mahany et al. |

FOREIGN PATENT DOCUMENTS

| | | |
|---|---|---|
| AU | A-80350/91 | 1/1992 |
| AU | B-80350/91 | 1/1992 |
| AU | 632055 | 12/1992 |
| AU | 696841 | 7/2006 |
| BE | 1002234 | 10/1990 |
| CA | 2045241 | 1/1992 |
| CA | 1316218 | 4/1993 |
| EP | 0 280 543 A2 | 8/1988 |
| EP | 0 465 971 A2 | 1/1992 |
| ES | 2 014 740 | 7/1990 |
| GB | 2162404 A | 1/1986 |
| GB | 2 196 766 A | 5/1988 |
| GB | 2 223 914 A | 4/1990 |
| GB | 2 223 914 B | 11/1992 |
| GB | 2 221 426 A | 2/1993 |
| IT | 1230308 | 10/1991 |
| JP | 61-196364 | 8/1986 |
| JP | 63-27969 | 2/1988 |
| MX | PA/A/1991/000168 | 7/1991 |
| WO | WO88/08649 | 11/1988 |
| WO | WO 89-04569 | 5/1989 |
| WO | WO92/02084 | 2/1992 |
| WO | WO 94/27382 | 5/1994 |
| WO | WO94/15413 | 7/1994 |

OTHER PUBLICATIONS

Qualcomm's Response To Interrogatory 3, with Exhibit A attached thereto.

Schmid, "Lunar Far-Side Communication Satellites", Goddard Space Flight Center, NASA TN D-4509, Jun. 12, 1968, pp. 1-19.

Barr, "Apollo Communications Configuration Handbook", NASA Manned Space Flight System, EB69-3701, Feb. 24, 1969.

Constantinou, "Mobile Communication-Channel Modelling", British Telecommunications Engineering, Aug. 1990, vol. 9, pp. 84-85.
Davey, "Data Preparation And Transmission In The Royal Air force Integrated Supply System", The Computer Journal, Jan. 1964, vol. 6, pp. 219-222.
Davis, "Man-In-Space Communications Subsystem", The LEM Program At RCA—Twelve Technical Papers By RCA Scientists And Engineers, 1966, pp. 21-29.
Leung, "Diversity Interconnection Of Wireless Terminals To Local Area Networks Via Radio Bridges", Electronics Letters, Feb. 27, 1992, vol. 28, No. 5, pp. 489-490.
Leung, "Internetworking Wireless Terminals To Local Area Networks Via Radio Bridges", IWC 1992, IEEE, 1992, pp. 126-129.
Lindsey, "Lunar Surface Transmission Loss For The Apollo Astronaut", NASA Technical Note, NASA TN D-4915, Dec. 1968, pp. 1-25.
Murphy, Interactions Between Terminal Mobility And Personal Mobility, 2nd International Conference On Universal Personal Communications—Conference Record vol. I, IEEE, 1993, pp. 198-201.
Proceedings of the Apollo Unified S-Band Technical Conference, Goddard Space Flight Center/NASA, Jul. 14-15, 1965, pp. 1-302.
Rubin, "Performance of Double-Tier Access-Contro; Schemes Using A Polling Backbone For Metropolitan And Interconnected Communication Networks", IEEE Journal On Selected Areas In Communications, 1993, vol. SAC-5, No. 9, pp. 34-39.
Sanderson, "Watch—A Low-Cost, Secure-Item Monitoring System", 1987, pp. 310-315.
Schilit, "The PARCTAB Mobile Computing System", 1993 IEEE, 1993, pp. 34-39.
"GE Mobile Radio MASTR® Executive II Vehicular Repeater Maintenance Manual LBI 32572A, Two-Way FM Radio Vehicular Repeater", General Electric, 1974-1975, pp. 1-12.
"RCA & Apollo 15", RCA Government Engineering, Thirteen Technical Papers By RCA Engineers And Scientists, RCA Government Engineering, 1972, pp. 24-25.
"RCA 'Radar Eyes,' Advanced Electronics To Help Apollo 11 Astronauts Land On Moon", RCA News, Special Apollo Edition, Jul. 1969.
"Special Report: Communications On The Moon", Electronics World, Aug. 1969, pp. 23-25 and 56-67.
Trucking Firm Uses Mobile-Radio Data Terminals To Communicate between Drivers And Dispatchers, Communications News, Aug. 1968, vol. 23, No. 8, p. 39(1).
Goodman, "Wireless Personal Communication Systems", 1997.
Press Information: Spcae Shuttle Transportation System, Rockwell International, Aug. 1981, pp. 1-463, esp. Ch. 17.
IEEE Standard Dictionary of Electrical & Electronics Terms—3rd Edition, pp. 539, 847, Aug. 10, 1984.
IEEE Standard Dictionary of Electrical & Electronics Terms—5th Edition, pp. 779, 780, 1234, 1235.
Specifications of the Bluetooth System, CORE, Specification vol. 1, Version 1.1, Feb. 22, 2001.
Profile Test Specification, Test Suite Structure (TS) and Test Purposes (TP) for Hands-Free Profile.
Order #1, Protective Order, Jun. 21, 2005.
Newton's Telecom Dictionary, 1993.
Darling, "Real-Time Mobile RF Terminals Boost Inventory Efficiency", Pulp & Paper, Apr. 1990, pp. 188-190.
O'Brien, The Invaluable "Walki-Talkie": Is The Portable Unit An Understimated Asset For Fire Service Communications?, Fire Engineering, Nov. 1956, pp. 1060-1062.
Olsen et al., "Apollo Experiences Report: Command And Service Module Controls And Displays Subsystem", NAS 1.14:D-8301, 1979, pp. 1-21.
Scaringe, Real-Time Data Collection Via Mobile Wireless Computer Terminals, Advance Manufacturing Systems: Proceedings Of The AMS '86 Exposition And Conference, Jun. 24, 1986-Jun. 26, 1986, pp. 745-749.
Expert Report of Stephen G. Kunin.
Qualcomm's Memorandum of Points and Authorities in Support of Its Motion for Summary Judgment of Invalidity of Claims 8-11 and 13 of U.S. Patent No. 6,359,872 (Sep. 8, 2006).
Qualcomm's Memorandum of Points and Authorities in Support of Its Motion for Summary Judgment of Invalidity of Claim 2 of U.S. Patent 5,682,379 (Sep. 8, 2006).
Broadcom's Corrected Opposition to Qualcomm's Motion for Summary Judgment of Invalidity of Claim 3 of U.S. Patent No. 5,682,379 (Oct. 25, 2006).
Broadcom's Corrected Opposition to Qualcomm's Motion for Summary Judgment of Invalidity of Claims 8-11 and 13 of U.S. Patent No. 5,369,872 (Oct. 25, 2006).
Qualcomm's Reply in Support of Its Motion for Summary Judgment of Invalidity of Claim 2 of U.S. patent No. 5,682,379 (Nov. 13, 2006).
Qualcomm Opposition to Broadcom's Cross-Motion for Summary Judgment on Effective Filing Date of U.S. patent Nos. 5,682,379 and 6,359,872 (Nov. 13, 2006).
Qualcomm's Reply in Support of Its Motion for Summary Judgment of Invalidity of Claims 8-11 and 13 of U.S. Patent No. 6,359,872 (Nov. 13, 2006).
Supplemental Expert Report of Stephen G. Kunin, Jan. 20, 2006.
Qualcomm Incorporated's Sixth Supplemental Objections And Responses To Complaint's First Set Of Interrogatories (Nos. 1-15), Dec. 9, 2005.
Qualcomm Incorporated's Responses And Objections To Broadcom Corporation's First Set Of Interrogatories (Nos. 1-31), Jul. 17, 2006.
Qualcomm Incorporated's Supplemental Responses And Objections To Broadcom Corporation's First Set Of Interrogatories (Nos. 1-31), Aug. 28, 2006.
Qualcomm Incorporated's Second Supplemental Responses And Objections To Broadcom Corporation's First Set Of Interrogatories (Nos. 1-31), Sep. 15, 2006.
McNamara, "Technical Aspect of Data Communication", Digital Press, 3rd Edition, 1988.
Bluetooth Patent/Copyright License Agreement, Bates Nos. QBB029532-29539.
The Bluetooth SIG: General Information & Membership Benefits, Bates Nos. QBB029518-19531, Apr. 2003.
Bluetooth SIG, Inc. Membership Application.
Acceptance of Associates Membership By Qualcomm, Includes Bluetooth SIG Application for Membership, Bates Nos. QBB029479-29482, Aug. 8, 2001.
MSM Overview & Data Sheets: Overview only—MSM7600, 7500, 7200 & 6125; Overview & Data Sheets—MSM6800, 6500, 6300, 6280, 6275, 6260, 6255, 6250, 6225, 6200, 6100, 6050, 6025 & 6000.
Specifications of the Bluetooth System, Profiles, Specification vol. 2, Version 1.1, 02/22/200.
Hand-Free Profile Adopted Version 1.0, Apr. 20, 2003 QBB 729883-719955.
Specification of the Bluetooth System, Profiles, Specification vol. 2, v1.0B, Dec. 1, 1999.
Broadcom's Complaint Under Section 337 Of The Tariff Act of 1930, As Amended, with index of Exhibits.
Gollnick Deposition Transcript, Oct. 27, 2005.
Bunte Deposition Transcript, Oct. 28, 2005.
Luse Deposition Transcript, Nov. 17, 2005.
Steven Koenck Deposition Transcript, Nov. 15, 2005.
Expert Report Concerning U.S. Patent Nos. 5,682,379 and 6,359,872 by Professor Stuart C. Schwartz.
MSM Overview & Data Sheet—MSM6150.
Posthearing Brief Of The Commission Investigative Staff, United States International Trade Commission, Apr. 3, 2006.
"Automation In Warehousing", Proceedings Of The 8th International Conference, Tokyo, Japan, Oct. 6-8, 1987, pp.1-355.
"Supporting Research And Advanced Development", NASA Space Programs Summary 37-48, vol. III, Jet Propulsion Laboratory, Dec. 31, 1967, pp. 1-291.
U.S. Appl. No. 07/699,818—file history.
U.S. Appl. No. 07/700,704—file history.
U.S. Appl. No. 07/982,292—file history.
U.S. Appl. No. 07/997,693—file history.
U.S. Appl. No. 08/027,140—file history.
U.S. Appl. No. 08/500,977—file history.
U.S. Appl. No. 08/959,432—file history.
U.S. Appl. No. 07/553,438—file history.
U.S. Appl. No. 07/716,707—file history.

U.S. Appl. No. 10/101,436—file history.
U.S. Appl. No. 10/458,597—file history.
U.S. Appl. No. 07/876,776—file history.
U.S. Appl. No. 07/854,115—file history.
U.S. Appl. No. 07/558,895—file history.
U.S. Appl. No. 07/529,353—file history.
Claim Construction Order for '872 Patent, and Court's Claim Construction, May 1, 2006.
Claim Construction Order for '379 Patent, and Court's Claim Construction, May 1, 2006.
NASA Technical Note, NASA TN D-6974, Apollo Experience Report—Lunar Module Communications System, Sep. 1972.
NASA, Apollo Program Summary Report, JSC-09423, TM-X-68725, Apr. 1975.
NASA, Apollo 17 Press Kit, Release No. 72-220K, Nov. 26, 1972.
Panasonic, Cordlessphone KX-T3000 EASA-PHONE.
Maj. Ondo, "Field Artillery Journal: PLRS/JTIDS Hybrid," Jan.-Feb. 1981, pp. 20-26.
Proffitt, 36th IEEE Vehicular Technology Conference, "The Portable Cell Site," May 20-22, 1986, pp. 291-300.
Rechter, IEEE Military Communications Conference, Conference Record vol. 1, "PLRS-JTIDS Hybrid (PJM) Satellite Overlay Concept," Oct. 21-24, 1984, pp. 280-283.
Elden, IEEE Military Communications Conference, Conference Record vol. 1 of 3, "Survival Networks For The 21st Century TACS," Oct. 20-23, 1985, pp. 210-214.
De Pedro, Planeta, and Perloff, IEEE Military Communications Conference, Conference Record vol. 1 of 3, "Multimedia Networking Techniques to Enhance Communications Survivability," Oct. 20-23, 1985, pp. 308-312.
Rice, E.J., IEEE Military Communications Conference, Oct. 5-9, 1986, Section 24.3.1-24.3.6.
Cummings, and Turner, Conference Record vol. 2 of 3, "A Mixed-Media Communications Architecture for Enhanced Interoperability," 1986.
Fernandez, IEEE Military Communications Conference, Conference Record vol. 1 of 3, "Architecture for Tactical C3 Systems Management," Oct. 19-22, 1987, Section 1.5.1-1.5.7.
Rafter, Walker, and Jones, IEEE Military Communications Conference, Conference Record vol. 3 of 3, "A Distributed Multiple Media Network Architecture," Oct. 15-18, 1989, Section 47.1.1-47.1.5.
Rafter, IEEE Military Communications Conference, Conference Record vol. 1 of 3, "Simulation and Performance of Multiple Media Networks for Tactical Communications," Sep. 30-Oct. 3, 1990, Section 13.5.1-13.5.4.
William, and Lee, Mobile Cellular Telecommunications: Analog and Digital Systems, Chapter 12, "Data Links and Microwaves," 1995, pp. 363-380.
Lessard, and Gerla, IEEE Network, vol. 2, No. 3, "Wireless Communications in the Automated Factory Environment," May 1988, pp. 64-69.
Dr. Williams, and Major Harris, IEEE: "Air Logistics Center Local Area Networks," 1989, pp. 1276-1282.
Wence, and Zenko, IEEE: "Breakthrough in Radio Technology Offers New Application Options," 1989, pp. 384-388.
Cochrane, Falconer, Mummert, and Strich, IEEE Communications Magazine, vol. 23, No. 10: "Latest Network Trends," Oct. 1985, pp. 17-31.
Leiner, Cole, Postel, and Mills, IEEE Communications Magazine, vol. 23, No. 3: "The DARPA Internet Protocol Suite," Mar. 1985, pp. 29-34.
Robertazzi, and Sarchik, IEEE Communications Magazine, vol. 24, No. 1: "Self-Organizing Communications Networks," Jan. 1986, pp. 28-33.
Parr, and Green, Jr., IEEE Communications Magazine, vol. 23, No. 8: "Communications for Personal Computers," Aug. 1985, pp. 26-36.
Chien, Goodman, and Russel Sr., IEEE Communications Magazine, vol. 25, No. 6, "Cellular Access Digital Network (CADN): Wireless Access to Networks of the Future," Jun. 1987, pp. 22-31.
Boggs, Shoch, Taft, and Metcalfe, IEEE Transactions on Communications, vol. Com-28, No. 4, "PUP: An Internetwork Architecture," Apr. 1980, pp. 612-624.

Rosner, IEEE Transactions on Communications, vol. Com-28, No. 9, "An Integrated Distributed Control Structure for Global Communications," Sep. 1980, pp. 1505-1515.
Brick, and Ellersick, IEEE Transactions on Communications, vol. Com-28, No. 9, "Future Air Force Tactical Communications," Sep. 1980, pp. 1551-1572.
Shacham, IEEE Transactions on Communications, vol. Com-31, No. 2, "A Protocol for Preferred Access in Packet-Switching Radio Networks," Feb. 1983, pp. 253-264.
Green, IEEE Transactions on Communications, vol. Com-34, No. 3, "Protocol Conversion," Mar. 1986. pp. 257-268.
Jubin, and Tornow, Proceedings of the IEEE, vol. 75, No. 1, "The DARPA Packet Radio Network Protocols," Jan. 1987, pp. 21-32.
Schacham, and Westcott, Proceedings of the IEEE, vol. 75, No. 1, "Future Directions in Packet Radio Architecture and Protocols," Jan. 1987, pp. 83-99.
Tsuchiya, ACM: "An Architecture for Network-Layer Routing in OSI," 1988, pp. 185-190.
Epstein, Gilmour, and Yoon, IEEE: "Application of Commercial Wireless LAN Technology to Forward Area Mobile Communication," 1993, pp. 490-496.
Rustad, Skaug, and Aasen, IEEE Journal On Selected Area In Communications, vol. 8, No. 5, "New Radio Networks for Tactical Communication," Jun. 1990, pp. 713-727.
Schoening, and Christian, U.S. Government, "Soldier's Radio," Section 20.1.1-20.1.3.
Kanterakis, and Stroebele, IEEE: "Soldier's Radio: Innovative Communication and Networking Technologies for the Individual Warrior," 1994, pp. 347-354.
Brendler, IEEE Communications Magazine: "Tactical Military Communications," Jan. 1992, pp. 62-72.
Brothers, Jr., Ginther, and Lehnert, IEEE: "Wireless Distributed Multimedia Communications Networks for the Digital Battlefield," 1996, pp. 349-356.
Woolnough, EETimes "Britain Offers Digital Cordless Phone Service," Dec. 14, 1987.
Motorola, SN249041, DNYA TAC Cellular Mobile Telephone, Instruction Manual, 68P81049E55, Feb. 4, 1983.
Sawyer, International Telemetering Conference, International Foundation for Telemetering, "Apollo Lunar Communications," Oct. 13-15, 1970.
Eugene Cernan Declaration, including exhibits at tab 1-4.
Mahany, Norand, Engineering Development Record Log, Sep. 21, 1989-Sep. 29, 1989.
Mahany, Norand, Engineering Log Sheet, Sep. 21, 1989-Sep. 22, 1989.
Koenck, Norand, Engineering Log Sheet, Dec. 13, 1991-Jan. 22, 1992.
Dietz, et al.., NASA Technical Note TN-6974, "Apollo Experience Report—Lunar Module Communications System.", Sep. 1972.
Government Reports—NTIS Publication GPA, Dec. 25, 1972.
Notice Regarding Issuance Of Initial Determination And Recommended Determination On Remedy And Bond.
Rebuttal Expert Report Of Dr. Jerry D. Gibson On Validity Of US Patent Nos. 5,682,379 And 6,359,872, Sep. 19, 2006.
Expert Report of Dr. Alexander Haimovich On The Invalidity Of The Asserted Claims Of U.S. Patent Nos. 5,682,379 And 6,359,872, Aug. 31, 2006.
Qualcomm Incorporated's Notice Under 35 U.S.C. § 282, Jan. 25, 2007.
Frankel et al., "An Overview Of the Army/DARPA Distributed Communications And Processing Experiment", IEEE Journal on Selected Areas In Communications., vol. Sac-4, No. 2, Mar. 1986, pp. 207-215.
Kleinrock et al., "Packet Switching In Radio Channels: Part 1—Carrier Sense Multiple-Access Modes And Their Throughput Delay Characteristics", IEEE Transactions On Communications, Dec. 1975, pp. 1400-1416.
Parker, "A Revolution In Distribution-Bar Code Readers And Radio Transmitter", Information Week, Jan. 12, 1992.
Schoppe, "The Navy's Use Of Digital Radio", IEEE Transactions On Communications, vol. Com-27, No. 12, Dec. 1979, pp. 1938-1945.

Schoppe, "The Navy's Tactical Data Network", Naval Air Development Center Communication Navigation Technology Directorate, IEEE 1984, pp. 531-538.

Kelley, "Mobile Subscriber Equipment (MSE)", Army Communicator, Summer 1986, pp. 6-16.

Johnson et al., "RITA: A look At The French Mobile Subscriber System", Army Communicator, vol. 12, No. 3, Summer 1987, pp. 18-19.

"Systems", Jane's Military Communications, 1983, pp. 736-740, pp. 24-39.

Lattier, Apollo Experience Report-Command And Service Module Communications Subsystem, NASA Technical Note D-7585.

Apollo 15 Mission Report, NASA, MSC-05161, Dec. 1971.

NASA, Apollo 14 Press Kit, Release No. 71-3K, Released: Jan. 21, 1971.

NASA, Apollo 16 Mission Report, MSC-07230, Aug. 1972.

Apollo 17 Mission Report, NASA TM-C-69292, Mar. 1973.

DABBS et al., NASA TN D-6739, Voice Communication Techniques & Performance, Mar. 1972.

NOSSEN, ITC USA, The Apollo VHF Ranging System, 1977, pp. 429-443.

Motorola Service Manual 58P81010C09A.

Theory Maintenance Manual 68P1010C05, 1982.

Kobayashi et al., "Detachable Mobile Radio Units", IEEE 1984, pp. 6-11.

U.S. Dept. of Commerce, Government Reports Announcements, vol. 72, No. 24, Dec. 25, 1972, p. 212.

"The Great Adventure", Newsweek Magazine, Jul. 21, 1969, pp. 68-75.

Expert Witness Report Of Larry S. Nixon Pursuant To Fed. R. Civ. P. Rule 26(a)(2)(B), Sep. 22, 2006.

Broadcom's Memorandum of Points And Authorities In Support Of Its Cross-Motion For Summary Judgment On The Effective Filing date Of U.S. Patent Nos. 5,682,379 And 6,359,872, Oct. 25, 2006.

Broadcom Corporation's Reply In Support Of Its Cross-Motion For Summary Judgment On Effective Filing Date Of U.S. Patent Nos. 5,682,379 And 6,359,872, Nov. 16, 2006.

War Department Technical Manual, TM 11-242, Radio Set SCR-300-A, Feb. 26, 1945.

* cited by examiner

MULTI-LEVEL HIERARCHICAL RADIO-FREQUENCY COMMUNICATION SYSTEM

CROSS REFRENCE TO RELATED APPLICATIONS

The present application is a continuation of application Ser. No. 11/345,113, filed Jan. 31, 2006, which is a continuation of application Ser. No. 10/809,108, filed Mar. 25, 2004, now U.S. Pat. No. 7,004,395, which is a continuation of application Ser. No. 09/467,255, filed Dec. 20, 1999, now U.S. Pat. No. 6,749,122, which is a division of application Ser. No. 08/239,267, filed May 6, 1994, now U.S. Pat. No. 6,006,100, which is a continuation of application Ser. No. 07/876,776, filed Apr. 28, 1992, now abandoned, which is a continuation-in-part of U.S. application Ser. No. 07/558,895, filed Jul. 25, 1990, now abandoned, which is a continuation-in-part of U.S. application Ser. No. 07/529,353, filed May 25, 1990, now abandoned.

Said application Ser. No. 07/876,776 is also a continuation-in-part of U.S. application Ser. No. 07/854,115, filed Mar. 18, 1992 now abandoned, which is a continuation-in-part of said U.S. application Ser. No. 07/558,895.

The above-identified patents and patent application are hereby incorporated herein by reference in their entirety. Also, U.S. Pat. No. 5,682,379 is incorporated herein by reference in its entirety.

BACKGROUND OF THE INVENTION

1. Field of the Invention

This invention relates generally to mobile data communications systems, and more particularly to data collection and processing systems for generating status records and for tracking operations of transferring articles, the systems using portable data terminal devices including hand-held data collection terminals for collecting, selectively processing and for communicating collected data to other system elements. Data may manually be collected via keyboard entry or they may be read in automatically by scanning indicia of information with a scanner, for example with a bar code reader. Collected data may become part of data bases or may be used at the site of acquisition for any of various operations. Operations may include printing out price tags of shelf items, printing customer sales receipts, orders, confirmations, invoices, or bar code labels for marking merchandise items. Collected data may be retained temporarily in memory of hand-held data collection terminals for future transmission as a batch transfer operation to a central data processing station of a data system. Alternatively, data may be transmitted by RF processes on a real time basis to the central station for inventory or billing purposes.

2. Discussion of Prior Developments

The prior art has developed to a state in which radio links between a central computer as a central data processing station and a plurality of substations is becoming well established in the art. Portable, hand held data terminals are coupled via RF (Radio Frequency) wireless data links to a transceiver and a multiplexing station and such a central processing station. The hand held data terminals are used, for example, for restocking merchandise items, thus, in the larger sense for real time inventory control and pricing of merchandise items.

In a currently pending patent application by Miller et al. entitled "Transaction Control System Including Portable Data Terminal and Mobile Customer Service Station", U.S. Ser. No. 07/345,146, filed Apr. 28, 1989, and assigned to the assignee of the present invention, at least one of the hand held data terminals is replaced by a portable customer service station which may include multiple components which are selectively addressed by the central processing station to print customer information at the portable customer service station, based on data inputs received from one or more of the hand held data terminals in the disclosed transaction system.

Other uses of centrally controlled operations relate to improvements in the delivery or service route business. In operations relating to delivery service, a delivery vehicle may contain a printer module which is mounted within the vehicle and which either may be powered by the vehicle or it may be battery powered and, hence, self-contained. The printer module may have associated therewith a terminal cradle such as is disclosed in a patent application of Phillip Miller et al., filed on Jan. 31, 1989, Ser. No. 07/305,302, entitled "Vehicle Data System", assigned to the assignee of the current invention. A hand held data terminal may be inserted into the cradle. The insertion of the terminal communicatively couples the terminal to the printer to enable the terminal to transfer data to the printer. This type of operation allows the route driver to use the hand held data terminal to complete a transaction at a customer's premises, enter a record of the completed transaction into the terminal, and use some of the entered information of the transaction record in a data transfer to the printer module to generate a printed invoice or waybill to present to the customer on the spot for acknowledgement and for the customer's records. The data terminal in such an operation may be of a batch type, in which the data terminal retains all transactional information regarding a plurality of deliveries in self contained memory, until the delivery route has been completed. At this time, the collected data may be transferred from the data terminal via a hard-wired data link to a central processing station.

The referred to co-pending application of Phillip Miller et al. further discloses a vehicle data system which expands the use of the hand held data unit to address a plurality of data devices which may be selectively installed and used in a service vehicle. The system may include at least one hand held data terminal which may be temporarily removed to gather data from outside of the vehicle, in a manner similar to that of the delivery route operation. As a particular example, a forklift truck is disclosed as a vehicle the operation of which is being advantageously affected by the vehicle data system. Through the data system an operator of the forklift vehicle may receive operating instructions on a real time basis. Each of the plurality of data devices may be selectively coupled via a vehicle-resident local area network (LAN) to other data devices as addressed, for example, by a LAN controller. A portable hand held data terminal may also contain programming to act as the LAN controller and may be removably received in a mobile mount adapter of the vehicle LAN. Alternatively, an RF modem may be coupled to the LAN and contain the network controller and further couple the LAN data bus with a stationary host central data processing station. The RF modem would be able to periodically supply data from the hand held data terminal and from various other LAN-coupled data terminals or measurement devices to the host station. Similarly, the host station may supply data to a data terminal, such as a printer as needed.

The above-described system of the Phillip Miller et al. patent application includes a further enhancement in that any of the described data terminals, such as a vehicle operation measuring gauges or the vehicle mounted printer, are selectively coupled to the LAN only when fully functional, and are otherwise not recognized as being present as part of the LAN.

Though more flexible than state of the art fixed device installations, the operational flexibility of such a system is limited by the configuration of the LAN installed in the vehicle. Data terminal adapters for a predetermined number of data terminals or peripherals must be configured to allow the system to serve a particular need. Even though vehicle LAN systems for the predetermined number of data devices are known to simplify wiring of the vehicle, the desired flexibility permitted under the disclosed vehicle data system would again increase the complexity of locating data terminal adapters selectively include various data terminals.

Improving the functionality of the referred to hand-held data collection terminals has been and will remain the endeavor of artisans skilled in the field of data systems using mobile or portable data collection or processing devices. While progress has been made in improving efficiency and functionality of hand-held data collection terminals, further improvements in functionality and in overall cost at the data collection end appear needed to advance the usefulness of state of the art data collection and processing systems.

SUMMARY OF THE INVENTION

It is therefore an object of the invention to provide a portable data system with the ability of being selectively enhanced without a need for pre-installed wiring to support any such selective enhancements.

It is an additional object of the invention to provide for selective placement of data terminals within a functional environment of a LAN controller without the need for a plurality of pre-installed data terminal adapters to receive such data terminals at any selected location relative to the LAN controller.

It is a further object of a particular aspect of the invention to provide versatility to a mobile LAN, such as a vehicle-resident LAN, to enable data terminals to be selectively added and repositioned without requirements for changing the wiring of such mobile LAN.

It is yet another object of the invention to provide a portable, hand held data terminal which permits scanning, display of data, printing, communication to a remote host computer or central data processing station, and other functions without an increase in size relating to such a diversity of functions.

It is still another object of the invention to provide a means of wirelessly communicating between a portable hand held data terminal and a plurality of peripheral devices dedicated to such portable hand held terminal.

In accordance with the present invention, a mobile communications system includes a dual RF transceiver communication device and has a first type RF transceiver means and second type RF transceiver means. The first type RF transceiver means is operative to transmit and receive first type RF signals for communicating with at least one of a plurality of first type data devices. Each data device includes a first type RF transceiver operative to transmit and receive the first type RF signals. The second type RF transceiver means of said communication device is operative to transmit and receive second type RF signals for communicating with a remote transceiver. The remote transceiver is operative to transmit and receive said second type RF signals and is coupled to a remote data terminal. The remote data terminal may be a central data processing apparatus, such as a host computer. The remote data terminal may, in the alternative, interact with the remove transceiver, and a second, long range remote transceiver to relay data over yet greater distances to yet a further long range transceiver. The hierarchical data communications system thus allows the first type data devices to be communicatively coupled to the further long range receiver. Advantages are realized in a large area radio frequency communications net, which is operative with a great number of relatively low cost devices at an outer working remitter of the system. In that the low costs of the first type RF transceiver means in conjunction with avoidance of installation costs and maintenance of a fixed wiring system tends to provide a more cost effective and more flexible communication system, cost savings may be realized at the outer working perimeter of the communication system, The second type RF transceiver means having a longer transmission range than the first type RF transceiver means may comply with more rigid transmission specifications.

In accordance with a particular aspect of the invention, a portable dual RF transceiver communication device having transceivers of the fist and second types of communicatively coupled by a radio frequency transmission link of a first type to at least one data terminal device including a transceiver of the first type, and is communicatively coupled by a radio frequency transmission link of a second type to a remote, fixed base station.

A method according to the invention includes communicating at a first type radio frequency between at least one mobile data communication device and at least one modular data terminal device. Such data messages at a first type radio frequency between are relayed by such at least one data terminal device to a base station at a second type radio frequency. The data communication device may selectively extract predetermined data from received messages and relay only selected data between said base station and said at least one modular data terminal device. The data communication device may further communication with a plurality of modular terminal data devices and redirect selected data as data messages among such plurality of modular terminal data devices.

Typical RF communication links between data communication devices are supplemented in the disclosed system by local networks or data systems of low level, low power data transceiver stations which are used with various data system devices, such as hand-held data collection terminals and printer terminals to constitute a low level communication system. The term "low level communication" is used to denote short range, low power transmissions in specially dedicated frequency bands as contrasted with the higher level or relatively high power transmission levels with correspondingly greater transmission ranges of typical RF communication links, as may be used by licensed commercial data communication terminals operating in respectively assigned, commercial frequency bands. Each low level local network system may be communicatively linked by a relay device to relay data messages between the low level local network and the typical RF communication channels of the hierarchically structured data system. The relay device, referred to as a data communication device, is a dual transceiver device. The data communication device uses a low level transceiver to communicate with the respective "low level data communication" devices, and a second, high level transceiver to correspondingly communicate over typical commercial data frequency bands.

The low level local network system may become coupled to a typical high level data system or a central data processor (host computer) in a manner other than by the dual transceiver device. Data transfer between the low level and high level systems may occur, for example, in a batch type transfer process. During periods lacking data transfer activity to the high level communication system, the local data network system is capable of operating as an independent data collection and processing system using low level communications among its local system components. Coupling data input and data output devices by low power communication links has been found to be particularly advantageous for tracking articles in transit, namely various boxes and crates which are transferred in express type shipping operations involving pickup and delivery operations.

DETAILED DESCRIPTION OF THE INVENTION

Figure 1:
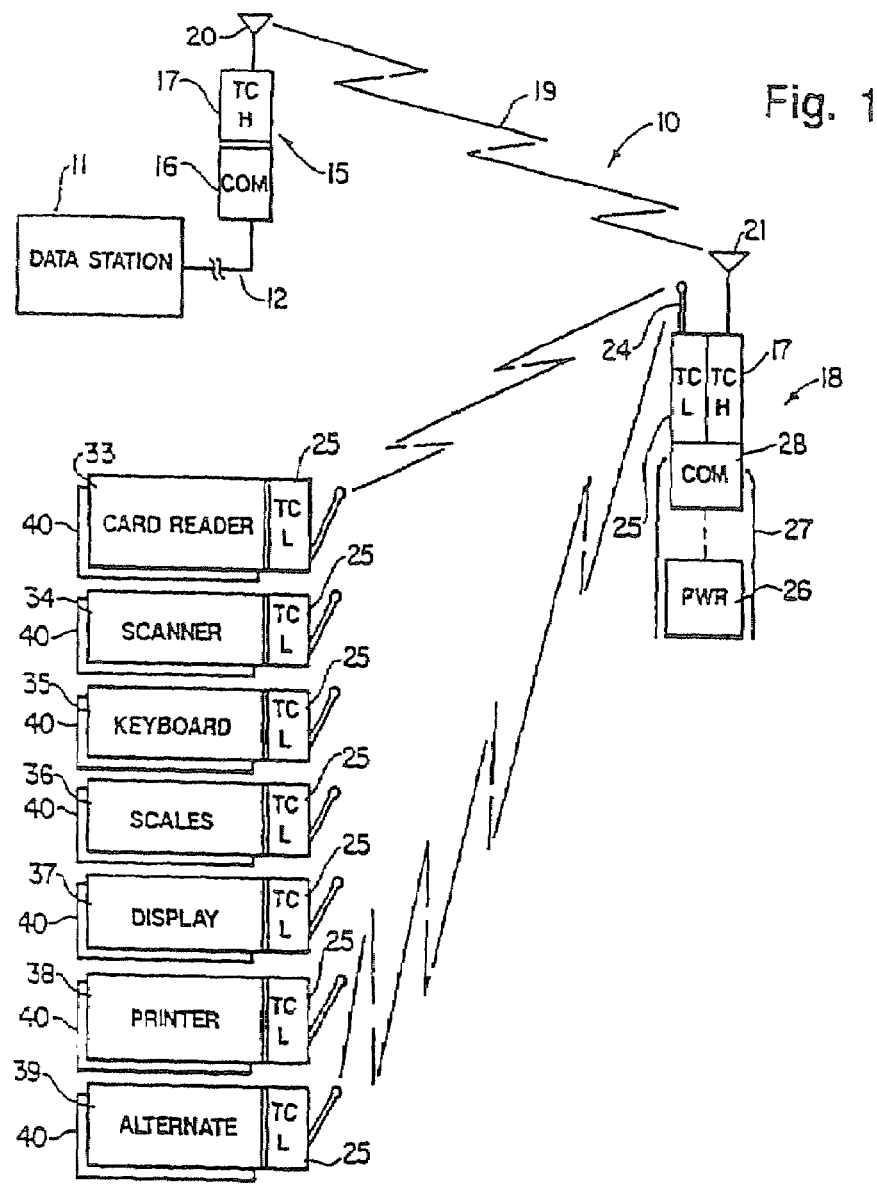
FIG. 1 shows a schematic representation of a multi-level communication system, showing various components which are contemplated to interact in a low level, low power communication network of the communication system.

Referring to FIG. 1, there is shown a multi-level, hierarchical mobile data communication system, referred to generally as a data system 10. The term "mobile" denotes the mode of operation of the data system 10 in general. Most of the terminal devices of the data system 10 are portable in the sense of being internally powered. These devices are adapted to be carried about by an operator either to be taken to where they are to be used, or they may be carried about while actually being used. In its hierarchical structure the data system 10 may be coupled to a stationary central or host computer 11 ("DATA STATION"). In many applications, the host computer is a mainframe computer and would not be "mobile" by itself. While the data system 10 as further described herein may communicate with a mainframe computer such as the host computer 11, the host computer 11 need not be part of the data system 10, as herein further described, for the data system to function in accordance with the present invention.

In further reference to FIG. 1, the host computer 11 may be coupled to communicate via a typical communication cable link or optical fiber link 12 to a communications interface 15. The term "communication" is used to apply to the transfer of data messages of information, operational instructions or combinations of information and operational instructions. Communication may also take place via radio frequency transmissions and receptions. When a data message is described as being transmitted from one device to another, an established link may be presumed. However, though a message is generally received by all terminals operating on the same frequency, selective addressing precludes processing of a message not addressed to a particular terminal. Therefore, the term "communication" also includes "selective communication".

The communications interface 15 includes a communications multiplexer module 16 and a transceiver 17. The transceiver 17 may be a frequency modulation ("FM") transceiver, operating on a frequency band allocated by the Federal Communications Commission to industrial FM transmissions. Alternatively, a spread spectrum transceiver may be used. The transceiver 17 is referred herein as having a high power transmitter and corresponding receiver module. Typical "ranges" over which such a transceiver can effectively transmit may be to five thousand feet or even longer. Transmitters operating on industrial FM transmission bands are subject to strict regulation by the Federal Communication Commission. Manufacturing costs and quality assurance procedures for the transceivers are moderately high to meet or exceed the required transmission standard. The term "high power" is used as a relative term to identify and distinguish one type of data transmission operation with respect to another type of transceiver module of a data communication device 18.

The communication device 18 also includes a matching transceiver 17 which forms a second terminal of a high power communication or transmission link 19 between respective antennae 20 and 21. The transceivers 17 correspondingly represent the terminal devices of a high power data transmission system 122 including the communications interface 15 and a shared portion of the communication device 18. The transceivers 17 consume during operation a considerable amount of electrical energy. A self-contained power source may therefore be of sufficient weight to negatively impact on the portability of the communication device 18. Of course, the communication device 18 may also be vehicle-mounted and be conveniently powered by resident vehicle power.

The antennae 20 and 21 are depicted schematically by typical triangular antennae symbols representative of the high level transmission system 122. In a hierarchical arrangement with the high level transmission system 122, FIG. 1 also shows components of a low level, low power transmission system. In the hierarchical data system 10 both high and low power transmission systems are preferred to be operated interactively as integrated subsystems of the data system 10. However, as will be shown, even in the absence of the hierarchical structure of the data system 10, advantages still exist with the low power or low level transmission system. The low level transmission system, designated generally by the numeral 123, is identifiable by devices including a low power transceiver including a respective antenna in the shape of a stick with a rounded end. A low level antenna 24 extends from the communication device 18 and particularly from a low level, low power transceiver 25 ("TC L") of the communication device 18. Each of the components of the low power transmission system 123 are coupled or associated with a respective one of the transceivers 25. The transceiver 25 communicates with first type radio frequency transmissions which are low power type transmissions in comparison to those of the transceiver 17, which are referred to herein as second type or high power transmissions. Desirably, the respective communication channels of the transceivers 17 and 25 are isolated from each other, allowing the low power transceivers 25 to communicate without interference with the high power communication of the transceivers 17. Channel isolation may be obtained by various means including the use of different frequencies or distinct, non-interfering modulation methods. For example, spread spectrum transmissions might incorporated utilizing different spreading codes to minimize channel interference. Such system might also include frequency hopping techniques to further improve channel isolation. Accordingly, all of the low power transceivers 25 are compatible and are adapted to communicate among each other, and all of the transceivers 17 would be compatible with each other and be adapted to communicate among each other. On the other hand, there can be no communication between a transceiver 17 and a transceiver 25.

In contrast to the transmission range of the high power transceiver 17, the expected range of the low power transceiver 25 is quite short. A typical low power transmission range may be expected to lie between ten and fifty feet. The maximum range of transmission may be no more than a few hundred feet. For the respective low power transmitting devices, such as the transceiver 25, operational standards are more relaxed. As a result, the production costs of RF frequency communication systems using low power transceivers 25 are well below those of comparable systems using the high power transceivers 17 for maintaining their communications links. The low power transmission system 123 has, therefore significant cost advantages over a comparable high power transmission system 122. Whenever data system components which are linked by RF transceivers are to be used in an environment wherein only short distances are expected to separate the linked components, the low power data transmission system 123 would appear to be advantageous with respect to the high power data transmission system 122.

FIG. 1 schematically emphasizes a connectible power source 26 coupled to the communications device 18. Particularly because of the anticipated power to operate the high power transceiver 17 over an extended of a typical working period, a more substantial and powerful power source such as the source 26 is preferred. The source 26, for example a rechargeable type NiCad battery, may include circuitry for alternate power to be supplied and to control a recharging operation.

The battery 26 supplies power to all functions, including both the high and low power transceivers 17 and 25, respectively, as well as a communication module ("COM"), also identified by the numeral 28. The communication module 28 of the communication device 18 includes those functions by which the communication device 18 becomes an effective interface between the high power and low power data transmission systems 122 and 123. The communication module 28 may include data modulation and demodulation circuits, converting signals between digital data signals and signals for transmission by either transceiver 17 or 25. The communication module 28 may further include identification and address circuits for implementing a protocol for a Local Area Network ("LAN").

Figure 3:
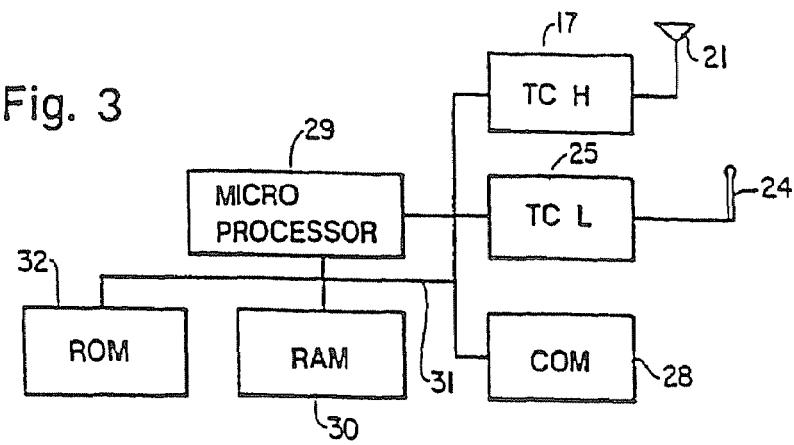
FIG. 3 is a block diagram of major components of a communication device including features of the present invention.

In reference to FIG. 3, there is shown a block diagram of major functional blocks which may be separately identified in describing the operation of the communication device 18. In addition to the high and low power transceivers 17 and 25, and the communication module 28, the communication device 18 is microprocessor controlled, and includes a processor circuit or microprocessor 29 ("MICRO PROCESSOR") of a type having the capability of addressing two separate radio frequency transceivers, such as the transceivers 17 and 25.

Typical state of the art microprocessors have the capability of processing data messages. The term "processing" as used herein includes a sequence of operations, typically controlled by an instructional program. The instructional program may be referred to as a "protocol." Data messages may contain one or more address codes, also instructional codes, and data codes. The microprocessor 29 has the capability of reading and interpreting a received data message. The microprocessor 29 typically responds by identifying an address or instructional code, storing the address or instructional code and the received data codes, storing the memory addresses of stored information, and by acting on instructions to assemble data messages and send such assembled data messages to an assigned device. More specific operations relate to controlling the low power communications in general, and to be available, on command, to receive from and transmit to the high power communication level. To avoid interference between local, low power communication and long range, high power communication, different channels may typically be assigned to low power and high power transmissions. However, to avoid interfering data communication transmissions on the local, low power level, the communication device 18 may disassemble received data messages and readdress portions thereof with another address code for retransmission on the local level to the designated data terminal device. Other portions of a received data message may be assembled into another data message to be transmitted to another data terminal device on the local, lower power level. Collectively the operations are referred to as "processing." In the specific environment of the communication device 18 the processing functions may not differ much in number from those of the host computer 11. However, they are dedicated to the specific purpose of relaying information between the low power and the high power data communication levels.

In the architecture of the communication device 18, modifications are possible within the scope of the invention. It may, for example, be desirable to use two separate, concurrently operating microprocessors 29 in substantially parallel operation, each to control the operation of a respective one of the transceivers 17 and 25. The operation of the microprocessor 29 typically includes a random access memory module 30

("RAM") for temporarily storing address codes, temporary control codes and data extracted from received data messages. The storage capacity of the memory module is 30 may vary, depending on the demands made on stored information and the type of operation desired. If information received via the low power transceiver 25 is to be uploaded to the host computer 11 only periodically as a batch transmission, then a greater storage capacity for the memory module 30 is desirable. If, however, data are relayed through the communication device 18 on a real time basis, then a comparatively smaller memory capacity in the memory module 30 may suffice. It may also be desirable to use the data processing power and capacity afforded by the microprocessor 29 and memory 30 to provide data processing within the communication device 18. Data are routed between the described functional circuit modules by a typical data bus 31. Also coupled to the data bus 31, the communication device 18 would further comprise a read only memory 32 ("ROM"). The memory 32 typically contains predetermined or fixed information, such as the operating protocol for receiving and transmitting data messages, extracting address codes from data messages, extracting data from data messages, routines for temporarily storing address codes and data, and various other routines as will become apparent from a description of the operation of the data system 10.

In a particular embodiment of the invention as described in reference to FIG. 1, the read-only memory 32 would include operating instructions to the microprocessor 29 as protocol for the operation of a LAN in accordance with the present invention. By incorporating the referred to LAN control or master protocol in the memory 32 of the communication device 18, the communication device 18 becomes effectively a LAN controller for a number of data terminals 33 through 39 as shown in FIG. 1. Typically, a LAN type operation permits data terminals within the LAN to communicate on an equal level among each other. Accordingly, all transceivers 25 being part of the same LAN would operate on the same radio frequency or channel. Thus, typically a transmission by any of the transceivers 25 may be received by all other transceivers within the LAN.

The communication device 18 has a first function as a relay device by completing a communication pathway between the host computer 11 and the data terminals 33 through 39. While receiving a transmitted message originating at the host computer 11 via the high power data transmission system 122, the communication device 18 processes the incoming signal and begins transmitting the message to the data terminals 33 through 39 via the low power data transmission system 123. These transmissions may take place simultaneously without interfering with each other because of the channel isolation. Although all data terminals 33 through 39 may receive a transmission from the communication device 18, only the data terminal which is specifically addressed within the transmission will respond to the transmission. Such specific addressing may originate from the host computer 11 or from the communication device 18 when relaying a transmission. Similarly, transmissions originating from the data terminals 33 through 39 are relayed to the host computer 11.

Secondly, the communication device 18 may also function as a communication controlling device using a LAN controlling protocol to manage the communication within the low power data transmission system 123. Without this controlling function, communication on the low power data transmission system 123 might involve, for example, a carrier-sense-multiple-access (CSMA) type protocol between any two data terminals 33 through 39 or between any data terminal and the communication device 18. This may be sufficient during low channel traffic conditions. However, under heavily loaded conditions, a controlling function may be more desirable. To function as a communication controlling device, the communication device 18 utilizes a LAN controlling protocol to manage the channel communication. For example, a polling type protocol originating from the communication device 18 might be used to schedule all communication occurring within the low power data communication system. Such a protocol might either permit direct communication between any two data terminals 33 through 39, or require indirect communicate between the two through the data communication device 18.

A third function that the communication device 18 may perform is one of data processing support to the data terminals 33 through 39. For example, the communication device 18 may retrieve data from one or more data terminal and perform calculations based on that data with reference to a database file located at the communication device 18. The calculated results might then be transmitted back to the data terminals for further analysis or display. Other examples described below further describe these functions in greater detail.

The data terminals are particularly identified as specific examples of various data terminal devices which may be coupled to function as a system as herein further described. In general, a data terminal is a data transducer. For example, the identified data terminal devices may be data input devices, data output devices, both or even a combination of a plurality of such devices. Whether they are data input or output devices, the data terminal devices "transduce" data from one form to another. A data output device would receive data from within the system and display the data as an output of a different form. In particular, a card reader 33 ("CARD READER"), a scanner 34 ("SCANNER"), a keyboard 35 ("KEYBOARD") and scales 36 ("SCALES") would be typical data input devices, in that data are obtained by such devices from sources external to the system 10, to be "transduced" or translated by the devices into digital binary data signals which can be communicated by electronic transmission within the system.

The scanner 34 may read various types of indicia, such as bar codes, characters or text, or capture signatures. Though the above input devices may primarily direct data into the system, address codes may nevertheless be received by the input device. Consequently, whether the primary data stream is in one direction only or in two directions, the process of transferring data either to or from a device is referred to herein as data communication.

The card reader 33 could in a most common example be a magnetic stripe reader for reading magnetically encoded identification data of a bank charge card or credit card and for translating such data into digital signals. The scanner 34 may be a typical laser bar code reader or other label reader for identifying marked codes on merchandise items (not shown), and for also translating such identified codes into digital binary coded data signals. Various modules of such laser scanners 34 are known and are commercially available.

The keyboard 35 may be an alphanumeric keyboard of standard size for a computer or typewriter, or it may be an alphanumeric keyboard of compressed size, as used with respect to portable, hand held data terminals. The keyboard 35 may, of course, be simply a numeric keyboard including possibly certain function keys, such as for arithmetic operations and for generating other instructional codes.

The scales 36 are contemplated to be digital electronic scales. As such the scales record a measured weight as electronically encoded digital signals. The scales may also provide a human readable digital output. The recorded weight is further communicable by digital signal transmission. Scales having weigh cells for transducing weight into an electronic data signal with a value equivalent to the magnitude of the sensed weight are generally known. In accordance herewith, it is contemplated to incorporate the scales 36 into a flat weight platform, preferably with a wedging edge that may support one side of an article to be weighed. The scales would typically weigh only one side or edge of the article, whereupon the position of the scales would be changed to the opposite edge of the article to be weighed. The combined weight measured at both edges is added to yield a rather accurate estimate of the total weight of the article.

In distinction over the described data input devices, the display 37 and the printer 38 are data output devices. The display 37 may be an LCD display, which may comprise an output screen of several lines for displaying alphanumeric data, it may be an LCD array of individually addressable pixels for both alphanumeric or graphic displays, or it may be one of several known luminescent data display screens including a typical cathode ray tube. For reasons of portability, an LCD display screen is preferred because of typically lower power requirements with respect to other display screens in the operation of such a device.

The printer 38 may be a thermal printer, such a printer being one type of printers with comparatively lower power requirements than mechanical impact printers. As a particular example, the printer 38 may be a bar code printer which translates data messages into machine readable codes. The codes may be printed on adhesive labels which are attached to packages or items which may be transported or delivered in typical merchandising operations. In another particular example, the printer 38 comprises a bar code and alphanumeric printer in combination with a magnetic stripe recorder, the recorder being in essence a printer of magnetically identifiable digital signals. The described data output devices receive data as binary data messages and translate such messages into either machine readable format or into alphanumeric display character messages, hence into human-readable messages.

In reference to FIG. 1, the described data input and output devices and the alternate data terminal device 39 ("ALTERNATE") are uniquely characterized in that each includes one of the lower power transceivers 25. Each of the data terminal devices 33 through 39 also includes the communication circuit 28 or similar circuitry for modulating and demodulating data messages. Each of the data terminal devices 33 through 39 desirably also includes a microprocessor and stored protocol as well as random access memory, as shown by the microprocessor 29, the read-only memory 32 and the memory 30 in FIG. 3, except that only the single transceiver 25 is present and programmed to be addressed. Each of the data terminal devices 33 through 39 preferably also includes a self-contained power source 40, as indicated by the stacked block representation in FIG. 1.

Because of a lower power requirement of the transceiver 25 with respect to the transceiver 17, the power requirement for the transceiver may be small, in comparison to the power requirement of the corresponding data terminal device. Since the power source 40 is adapted to serve the needs of both the data terminal device and the lower power transceiver 25, the power source designated 40 may vary in size and storage capacity, depending on the type of device to be served, and will be generally smaller than that of device 18.

Figure 9:
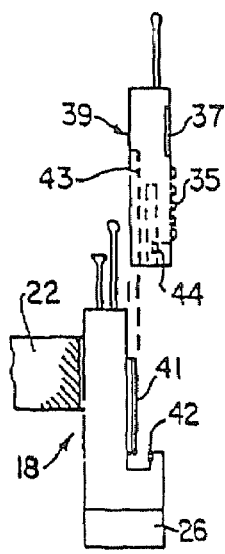
FIG. 9 is a simplified representation of details of a communication device in accordance with the present invention enabling a data terminal device to be temporarily coupled thereto.

In a particular embodiment illustrated in FIG. 9, the data terminal device 39 comprises a combination of input and output devices, and in particular a functional keyboard 35 and a functional display 37. Because of the typically lower power requirement of both the keyboard 35 and display 37, the major power consuming device is the transceiver 25. A criterion of the hand held data terminal device 39 as configured is an optimally minimal weight. FIG. 9 consequently shows a configuration in which the communication device 18 is belt-carried and comprises a high capacity self-contained power source 26. The communication device 18 is configured to include a guide track 41 and contact elements 42. The data terminal device 39 features a complementary guide track 43 and contact elements 44 complementary to the contact elements 42. The communication device 18 together with the high capacity battery or power source 26 has comparatively much greater weight than the data terminal device 39, as configured as hand held data terminal. Between uses, the operator may temporarily seat the data terminal 39 on the guide track 41 of the communication device 18 which forms a holder for the data terminal. While the data terminal 39 is seated as described, the power source 40, such as a NiCad battery of smaller capacity than the power source 26, may be recharged by the power source 26. The self-contained power source of each such data terminal device 33 through 39 may in some user configurations advantageously be replaced by alternate external power supplied from available line sources. This may be particularly desirable when the data terminal devices 33 through 39 become functional units of a service vehicle, such as a typical route delivery vehicle or a typical warehouse vehicle, such as a forklift truck (not shown). While it may be desired to provide such connectible external power and the respective power wiring, such wiring is nevertheless more simple than the provision of a vehicle installed LAN. Power supplied to each of the data terminal devices is preferably of the same voltage, such that the power connectors are typical and may all be of the same type. This is different with respect to data communication wiring which may need to differ depending on what type of data terminal is to be installed.

Referring back to FIG. 1, with respect to radio frequency data communication, the protocol stored in each respective one of the memories 32 is capable of identifying the respective data terminal device as to its characteristic function when placed "on line." Thus, each of the data terminal devices 33 through 39 have the capability of becoming integrated into the LAN upon becoming operational. The distinction over a LAN is that the typical hard wiring and terminal adapters are eliminated.

An immediate advantage is that products fundamentally dissimilar in a mechanical sense can be added. As another data terminal device 39 with a previously not anticipated mechanical configuration becomes a desirable addition to the previous system, such device may be added via the low power transceiver 25. The transceivers 25 become "connectors" for coupling any such additional devices into the system. The LAN, as described herein within the scope of this invention could therefore be referred to as a "virtual" LAN. Though an immediate distinction, the elimination of the wiring, however, may not be the most significant advantage of the wireless LAN. Instead, another major advantage is seen in an increased flexibility to adapt the presence of functional units or data terminal devices to serve a particular need with essentially no other effort or cost than that of the added device. Product innovations can be made in which the new products need not be bound by physical compatibility constraints. The referred to flexibility extends to both additions and deletions of functional units such as the data terminal devices 33 through 39. Any one of the devices may be deleted from or moved within the data system 10 and assigned to another user location. The described functional exchange further includes the ability to exchange any defective data terminal device 33 through 39 for a functional equivalent. If it is desirable for several of the described LAN systems to coexist in proximity, different operating channels may be chosen.

Figure 7:
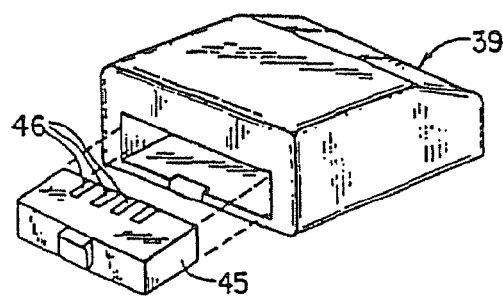
FIG. 7 is a simplified representation of a data terminal device including features of the present invention.

As shown in FIG. 7 with respect to the data terminal device 39 ("ALTERNATE"), for each LAN it may be desirable to provide each of the data terminal devices 33 through 39 with a removable cartridge 45 which may contain the memory 32 with data identifying the data terminal device with a particular LAN. The cartridge 45 may also contain a dedicated communication circuit or program to assign or configure a predetermined communication channel to establish the desired communication link between the respective device 33 through 39 and the corresponding communication device 18. Electrical contact elements 46 which may be disposed on the cartridge will be urged into contact with complementary electrical elements (not shown) located within the respective data terminal device.

Figure 4:
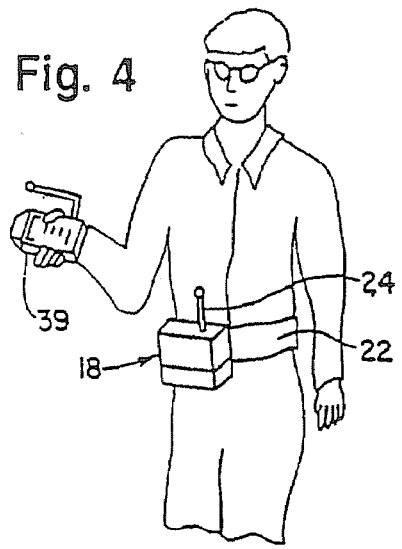
FIGS. 4 and 5 are simplified representations of uses of the communication device shown in FIG. 3 and of data terminal devices embodying features of the present invention.

The data terminal device 39 may be any of a number of devices including, or other than, the data terminal devices 33 through 39 already described in detail in reference to FIG. 1. As an example of a data terminal device 39 other than those already described, reference is made to a mobile vending system. In a mobile vending system, such as a delivery vehicle for delivering pizza or ice cream or any other route delivery operation, the driver may be likely to handle significant amounts of cash. In such an operation a truck-mounted cash drawer may be desirable. The alternate data terminal device 39 may consequently represent a cash drawer. The alternate data terminal may also be a transducer of data relating to the operation of the vehicle itself, for example, providing data records on the number of miles driven or on fuel consumption. As another example, the alternate data terminal device 39 may be a portable data entry terminal which may be used by door-to-door vending or polling operations. Data are entered by such a portable data entry terminal and are immediately transmitted to the communication device 18. The communication device 18 itself may be belt-carried by an operator, as shown in FIG. 4, or it may otherwise be mounted in a vehicle parking in proximity. In the latter example, the data terminal device 39 may include the already described circuit functions of a keyboard and a display device. The device 39 would nevertheless be considered within the LAN as a single data terminal device. As a data terminal featuring a keyboard and display, the device does include both data input and output functions and would be recognized as such by the respective communication device 18.

A particular advantage of the data terminal device 39 over state of the art terminals is that data storage and other functions may be minimized by removal from the hand-held device to a self-contained data terminal device of the LAN. Extensive portable computing power or customer information storage devices may, for example, be carried in another data terminal device 39 on the belt of the operator. The data terminal device 39 may use the data storage capacity and processing power afforded by the communication device 18, or communicate via the communication device 18 within the host computer 11. Thus, FIG. 4 showing the communication device 18 carried on the belt of the operator could also show a data terminal device 39 carried by the operator in a similar manner.

Figure 5:
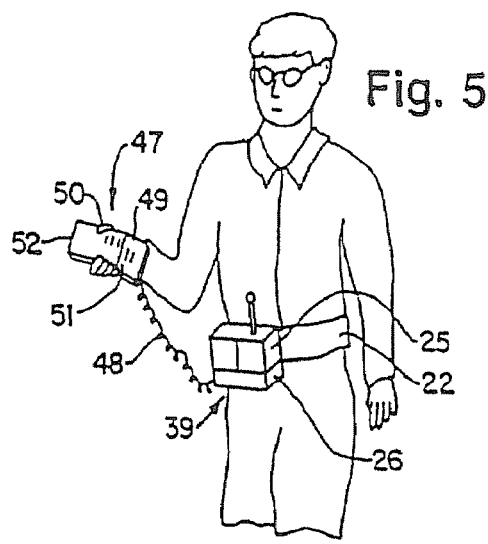

FIG. 5 shows an alternate embodiment in which a data terminal device 39 is belt-supported and carried by an operator. The data terminal device includes a separate, hand held data entry module 47 which is coupled to the data terminal device 39 by an electric cord 48. The data entry module 47 depicted in FIG. 5 includes a keyboard 49, a printer 50, a display screen 51 and a laser scanner 52. The power source 26 for the hand-held elements of the data entry module 47 is preferably located with the transceiver 25 on the belt of the operator. Other supporting circuitry, to the extent possible, such as memory modules, and any other elements which are not needed in the hand held module 47 itself, are also contained in the device 39 as carried by the operator's belt. An advantage is a minimal weight without loss of functions with respect to state of the art data terminals. State of the art terminals which include such elements as a keyboard and display as well as a printer and laser scanner traditionally have had substantial hand-supported weight and size.

Figure 2:
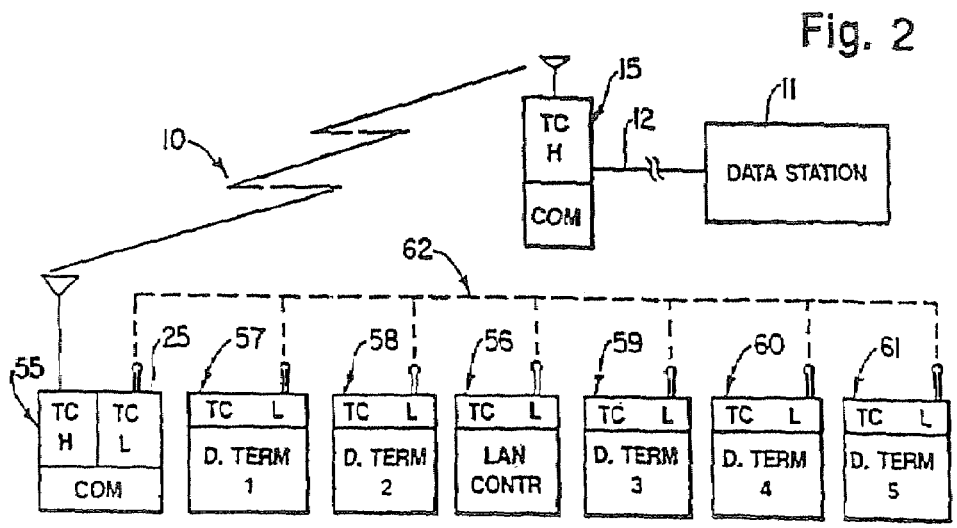
FIG. 2 is a simplified schematic diagram of an alternate embodiment of the invention.

Referring to FIG. 2, there is shown an alternate embodiment of the data system 10 as described in substance with respect to FIG. 1. In particular, the communication device 18 shown in FIG. 1 has been modified in that the referred to LAN control protocol has been removed to result in the communication device designated by the numeral 55 in FIG. 2. The communication device 55, except for not having the capability of functioning as a LAN controller, includes all of the functional elements of the communication device 18, as described in reference to FIG. 3. Thus, in order for the LAN to function, one of the data terminal devices, identified by the numeral 56, becomes a LAN controller. The LAN controller 56 includes as a component of the data system 10 the described functional elements typical of a data terminal device, namely the transceiver 25, the communication module 28, the microprocessor 29, the memory 30 and the read-only memory 32, functionally coupled as in FIG. 3, except for the high power transceiver 17 and its support functions. The use of the separate LAN controller 56 results in an advantage which frees the communication device 55 from continuous contact with other data terminals of a particular LAN, such as identified generally by "D. TERM. 1" through "D. TERM 5", also identified by numerals 57 through 61, respectively in FIG. 2. The LAN controller 56 in accordance with the described hierarchical operation would exercise the function of polling the addresses of possible data terminals 57 through 61. In a first alternate embodiment, the LAN controller may also poll the low power transceiver 25 of the communication device 55. The LAN controller's function of polling the LAN device is a deviation from the preferred hierarchical communication, in that the communication device 55 is the link or interface to the next higher level communication. As such the communication device 55 may be preferred to control its own operation, as described in the following alternate embodiment.

A second alternate embodiment of operation places the communication device 55 on a second level of the data or communication system 10. Accordingly, the LAN controller polls only the data terminal devices 57 through 61 in low power radio frequency communication. The LAN controller receives data messages in response to such polling operation, and relays the data in accordance with received addresses of data messages and stores those of the received data that are to be further communicated within the data system 10. The communication device 55 in this latter embodiment also contains a protocol for polling data terminal devices. Accordingly, the communication device 55 selectively polls or addresses the LAN controller 56. Upon receipt of a "handshake" signal indicating a message to be transmitted to the communication device 55, hence to be uploaded within the hierarchy of the data communication system 10, the LAN controller transmits to the communication device 55. Thus, in this latter embodiment, the LAN controller 56 functions as a communication device as described herein, except that both the active polling function and the passive function of being polled or addressed with a message transpires over the same, low power transceiver 25.

In accordance with a "soft" coupling of the data terminal devices of the data system 10 in general, a device which is not functional within the LAN is also not logged on, so that the absence of any one of the data terminal devices from the LAN does not generally affect the operation of the remaining data terminal devices within the LAN. Consequently, it is possible to remove the communication device 55 temporarily from the LAN identified in FIG. 2 by the numeral 62, without affecting the operation of the LAN 62. In the latter alternate embodiment the communication device 55 is further capable of selectively addressing and polling a plurality of LAN controllers 56. This latter operation permits several identical combinations of data terminals to be controlled selectively by the communication device 55 via separate LAN controllers 56.

A temporary removal or deactivation of the communication device 55 also temporarily interrupts communication with the host computer 11 via the communications interface 15. Such interruption may be a desired condition for certain system configurations in which the number of the communication devices 55 which may be addressed is limited. A single communication device 55 may then selectively be switched between LANs to upload data to the host computer 11 from more than one LAN without interruption of the continuous operation of the LANs.

A particular mode of operation of a first or low level communication may be explained in reference to FIG. 1. The mode is one in which the communication device 18 controls the LAN and relays data messages to the data terminal devices 33 through 39. In operation, the communication device 18 communicates with the data terminals 33 through 39 by, for example, sequentially polling each available address that may be populated by one of the data terminals to establish whether data is ready to be submitted by a respective one of the terminals polled. If the respective data terminal polled has a data message available, the data is transmitted from the respective data terminal and received by the communication device 18. Similarly, when data is to be transmitted from the communication device 18 to one of the data terminals 33 through 39, a presence "handshake" signal may first be received from a specifically addressed one of the data terminals. The data message is then transmitted by the communication device 18. While the transmitted data message may be received by the respective transceivers 25 of any and all of the data terminals present, the message is typically addressed in a manner to be uniquely identified only by one of the data terminals. The protocol may also permit simultaneous transmissions to more than one of the data terminals. For example, it may be desired to send a data message simultaneously to the printer 38 and to the display 37. The protocol may be configured to recognize a certain data message from the keyboard 35 to address a re-transmitted data message to be received and applied simultaneously by the printer 38 and the display 37 as a simultaneous data message communication. It may also be desired to "broadcast" to all of the data terminal devices within the LAN. An example of such a broadcast that may be desirable under certain circumstances would be a general "reset" command communicated simultaneously to all devices with the LAN.

The keyboard 35 transmits through its transceiver 25 the data message to the communication device 18. At the communication device 18, the protocol identifies the received data message as having originated at the keyboard 35. Thus, the data message may be stored in the memory module 30 and may also be re-transmitted to the display 37. In effect, the keyboard has communicated data to the display 37. Additionally, data stored in the communication device 18 may be further processed or transmitted. The described operation pertaining to communication between the data communication device 18 and the data terminals 33 through 39 is referred to as first level communication. The described first level communication is the low power, short range communication.

Figure 6:
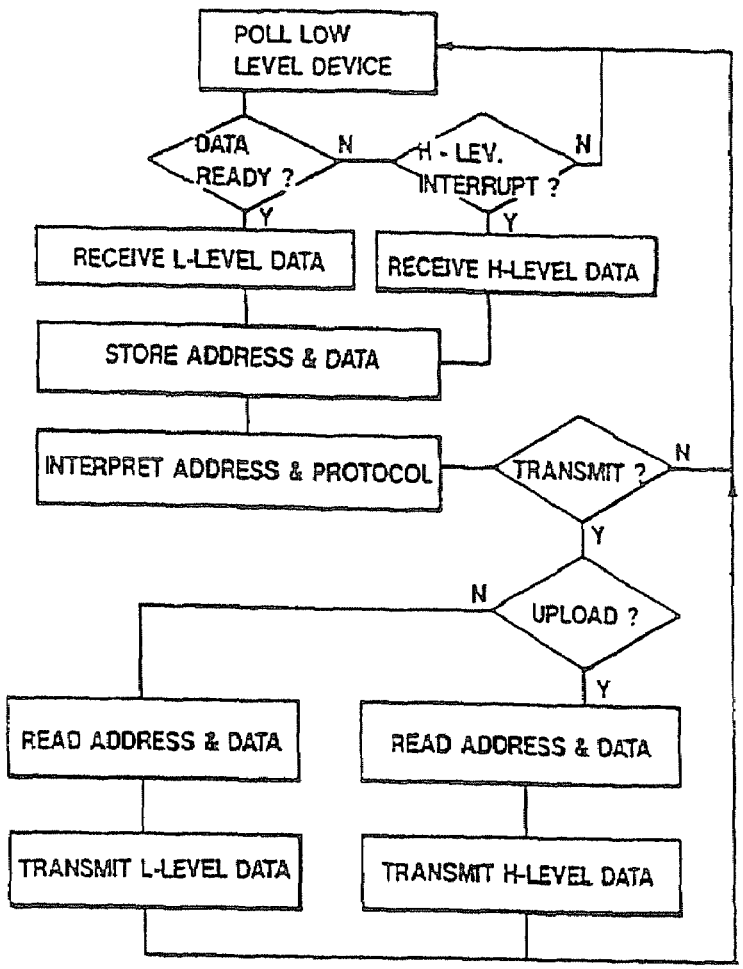
FIG. 6 is a flow diagram showing operational steps of a communication device in accordance with the present invention.

The flow diagram of FIG. 6 illustrates as an example a polling type mode of communication with both high and low power data message transmissions and receptions. For an understanding of the following description of major communication steps, reference may be made FIG. 1. The described mode of operation of the communication device 18 does, however, also apply to the communication device 55. In accordance with the hierarchical data communication set forth herein, the polling referred to herein transpires preferably in a "downward" directed mode. As an example, in a multi-level communication system, the highest level may be a "third" level. Thus, the third level communication device may poll on a third level a plurality of second level communication devices. In turn, the second level communication devices, which may be the communications interface 15, would poll on a respectively second level a plurality of first level communication devices, such as the communication device 18. The communication device 18, in turn, polls on a first or lowest level of communication the data terminals 33 through 39. It should be understood that a protocol according to which a plurality of data terminals are polled is but one of a number of acceptable protocols according to which data may be selectively communicated among such data terminals. Other protocols are also well known and have been used in addressing selected ones of a plurality of data terminals. Among protocol types which are known in the art and which may be employed for LAN communication are, for example, contention type protocols. For example, a "carrier sense multiple access" ("CSMA") protocol is a contention protocol which may be used in a LAN. It may be desirable to substitute a contention type protocol for data terminal device polling in certain implementations of the invention.

The flow diagram in FIG. 6 illustrates for example a pattern of communication on a first or lower level, such as between the communication device 18 and the data terminal devices 33 through 39, and communication to its next higher level. Beginning at the top of the flow chart, one of the low level devices is polled. When data is ready to be transmitted by one of the data terminal devices, for example the card reader 33, "data ready" is answered in the affirmative and the communication device 18 receives data from the reader in form of a first level radio frequency transmission. The received data message typically including at least one address code and data codes is stored in the memory module 30 (see FIG. 3).

A following step is identified as a protocol check. The communication device 18 needs to determine what to do with the received data message or information. The step "interpret address and protocol" refers to obtaining routine information from an address code portion in a check against program instructions referred to as "protocol". For example, if the received data message is an input from the card reader 33, the information may need to be transmitted to the host computer 11 for verification. The following test steps show results dictated by the programmed protocol in light of the "address" information of the data message.

In that the "address" code may denote not only origin but also destination information, the "address" may be considered indicative of routing information. Routing instructions are implemented in reference to the programmed protocol. With respect to the example, the "transmit" and "upload" queries are answered in the affirmative, the data message is read from memory and transmitted on the next higher level, as indicated by the steps "read address & data" and "transmit H-level data".

The flow chart depicted in FIG. 6 should be understood to be a simplification for illustrative purposes of a representative operational sequence of the communication device 18. A typical simplification becomes apparent with respect to another example. A data message is received as described form the keyboard 35. The protocol may, for example, provide for the received data to be transmitted on the first or lowest level to the display 37. Also, the "data" may have represented a query from the keyboard to the host computer requesting a current price on an item number transmitted in the data portion of the data message. A query code in the address determines that the data need to be communicated to the host computer 11. Thus, the "upload?" question is then answered in both the negative and the affirmative, such that the data message may be transmitted under "transmit L-level data" via the communications interface 15 to the host computer.

An alternative procedure may assign first level or first order communication priorities. Accordingly, in the last example, the receipt by the communication device 18 from the keyboard 35 is addressed and transmitted without delay to the display 37 to allow the request to be visually verified before an address instruction is executed to transmit as an "upload" via the communications interface 15 to the host computer 11. In general, a protocol giving first level communication priority is preferred. The data terminal devices 33 through 39 are typically expected to interact as a local system through the "virtual LAN". Thus, delays in transmitting data from the keyboard 35 to the display 37 within the same level may be undesirable. A delay of reasonable length in receiving a reply from the host computer 11 may typically be expected. Typically the communications interface 15, as shown in FIG. 8, would serve a substantial number of similar communication devices 18, generating opportunities for short transmission delays to some of the communication devices 18.

In reference to the polling operation shown in the flow diagram of FIG. 6, after having polled one of the data terminal devices with the result of no data ready, the protocol may cause the communication device to check whether the communications interface 15 is ready to download a data message to the respective communication device 18. If the query is negative, the polling of the data terminal devices continues. If the check of second level data waiting ("H-LEV. INTERRUPT?") is answered in the affirmative, the communication device 18 receives the data message, stores its address and data portions and continues to process the received data message in a manner described with respect to the receipt of a low level or first level data message.

Figure 8:
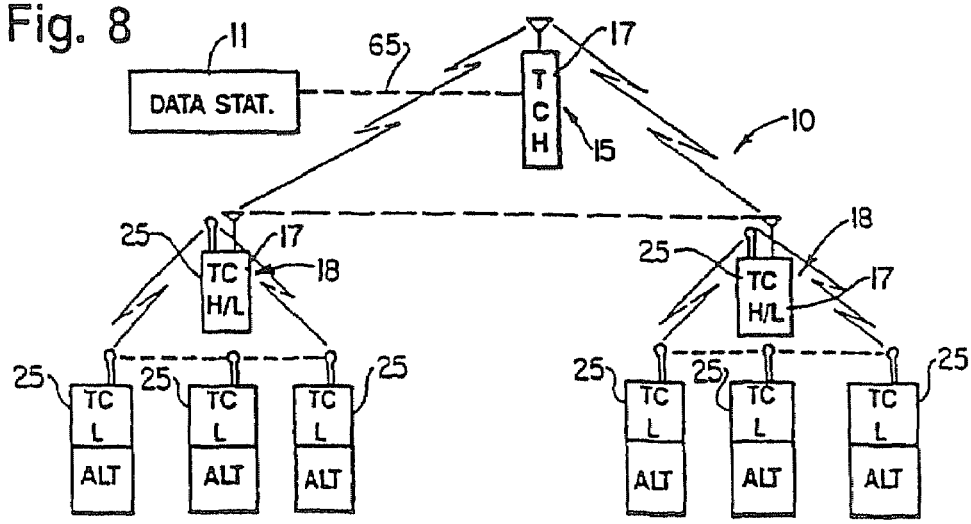
FIG. 8 shows a schematic diagram of a further embodiment of the present invention.

FIG. 8 illustrates further the hierarchy of the high power, low power communication and the resulting multiple of operations possible within the data system 10. In the schematic representation of the data system 10 in FIG. 8, the high power transceiver 17 of the communications interface 15 is operated in a multiplex mode in which the communications interface 15 is capable of addressing a predetermined number, for example sixteen, of the communication devices 18. The devices 18 are generally located remote from each other. Each of the devices 18 is typically an active receiving unit within a separate LAN. Thus, each of the LANs would contain one or more low power transceiver 25, each low power transceiver 25 representing a terminal of a communication link to a respective data terminal device ("ALT"), which may be any of the terminal devices described or referred to herein.

The communications interface 15 controls data communication between any of a plurality of LANs and the respective host computer 11. A communication link 65 between the communications interface 15 and the host computer may be a data conductor such as the data conductor 12 referred to with respect to FIG. 1, or the link 65 may be one of a number of links of yet a third level of multiplexing to the host computer 11. In either case, the communications interface 15 relays data messages based on instructions from the host computer 11 to the communication devices 18 and their respective LANs.

Figure 10:
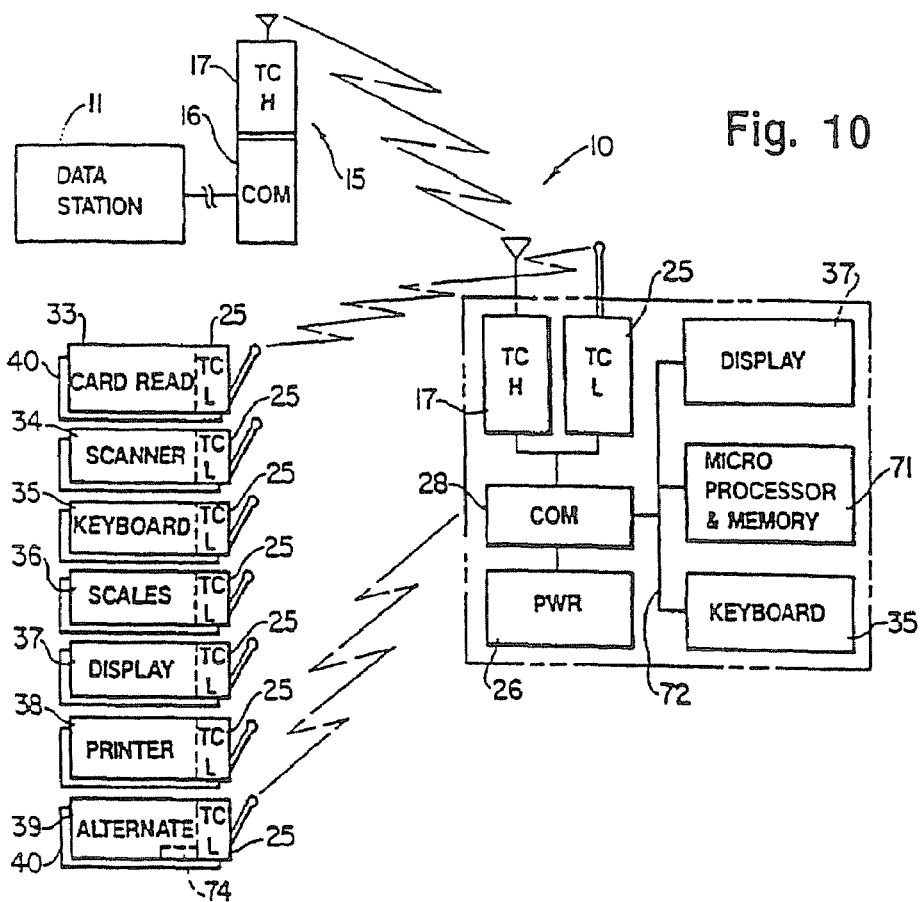
FIG. 10 is a schematic representation of another embodiment of the present invention.

FIG. 10 illustrates a further alternate embodiment of the data system 10 described with respect to FIGS. 1, 2 and 8. In particular, FIG. 10 illustrates schematically the substitution of a data terminal and communication device 70 for the communication devices 18 or 55 illustrated in FIGS. 1 and 8 or FIG. 2, respectively. The data terminal and communication device 70 combines with the features and functions of the previously described communication device 18 a display device 37, such an LCD display device, and a keyboard 35 which may be an alpha-numeric keyboard and may include in addition keys which double as function keys in accordance with current practice for data terminals.

The diagrammatic block representation of a "MICRO PROCESSOR & MEMORY" circuit 71 would typically include the microprocessor 29, the RAM memory 30, the ROM memory 31 and interconnecting portions of the data bus 31 as hereinbefore described. The microprocessor 29 may be modified as already described to include at least one additional processor circuit, while the memory 30 may be expanded to support within the device 70 data storage and processing functions of a computer. The "PWR" battery pack 26 is desirably coupled to power all functions of the device 70 via data and power bus 72.

The device 70 may be portable in the sense of being carried about by a person while such person may actually be operating the device 70. Such operation may be active communication with one or more of the data terminal devices 33 through 39 via the low power transceiver 25. Alternatively, the person may be communicating via the high power transceivers 17 with, for example, the host computer 11, or in the absence of communication with the latter, by working the keyboard to process data locally. The device may also be considered portable in the sense of being mounted or installed on a forklift vehicle to communicate with one or more data terminal devices 33 through 39.

The device 70, consequently, enhances the operation of the communication device 18. As the communication device 18, the device 70 supports the described LAN type operations as first, low power level communications, or by relaying data messages by converting low power radio frequency communications to high power radio frequency communications or vice versa. In addition, the device 70 functions as a local data processing station. The data processing enhancement may be of particular importance when mobile operation from a vehicle is desired and the device 70 is temporarily out of communication range even on the high power communication channel of the transceiver 17.

The device 70 has the further advantage of allowing resident data to be manually changed in accordance with changed conditions which may be encountered on real time basis. For example in inventory control operations, the device 70 may contain all initial data relating to merchandise items in a warehouse. As a LAN controller, the data terminal devices 39 relaying data to the device 70, while the person operating the device 70 may supervise an inventory taking operation.

Simultaneously with being able to send instructions to operators of the data terminal devices 39, the operator of the device 70 may access the data base within the device 70, compare received data and make decisions regarding variations or discrepancies deduced from the received data. Similarly, on a delivery route, the driver of a delivery vehicle may be able to change an order and provide the recipient of such order with an updated invoice. The updated information would be stored in the memory of the circuit 71 for subsequent transfer to the host computer 11 or other data storage or processing means as may be desired. Various other applications similar to those examples already described may be realized with the enhancements of the data terminal and communication device 70.

Figure 11:
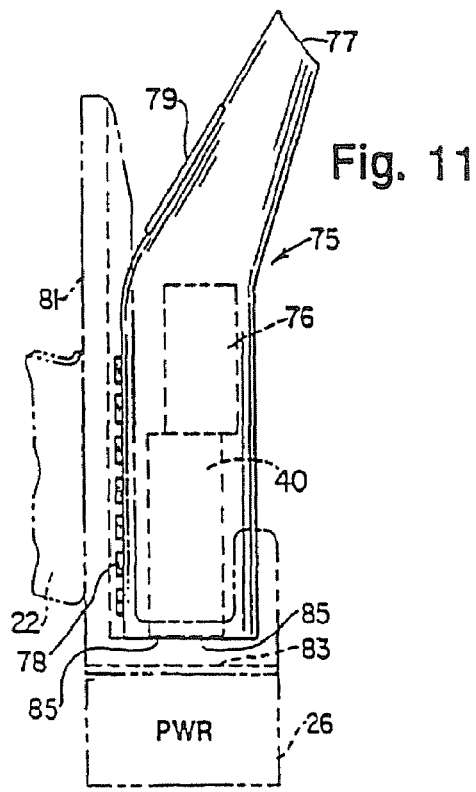
FIG. 11 is a simplified representation of a data entry device for illustrating certain features of the invention.

A further enhancement of the data system 10 which particularly relates to the usefulness of the low power data terminal device 39 is found in an alternate embodiment of the device 39. On a selective basis, the device 39 may be provided with a further communication device 74, in addition or as part of the transceiver 25, such as is indicated for example in FIG. 10. The device permits a data entry and scanner device 75 which may functionally be part of the data terminal device 39 to become independently mobile with respect thereto. Referring to FIG. 11, there is shown a simplified representation of a data entry and scanner device 75. The data entry and scanner device 75 includes some features similar to those of the data entry module 47. However, in distinction over the data entry module 47 shown in FIG. 5, the data entry and scanner device 75 includes a data input and communication circuit module 76 which is communicatively coupled to the communication device 74 of a selected one of the data terminal device 39 to support wireless communication therewith. Various short range wireless communication means are known and commercially available which may be utilized to communicate data over a very short range, such as up to ten feet. Data communication may be by low power radio frequency over a special channel to the data terminal device 39 which is specially encoded for reception of data from the circuit module 76. Other modes for communicating data to the data terminal device 39 may, for example, include an ultrasonic signal carrier wave. It is understood that the designated data terminal would be equipped with a compatible carrier wave transducer or receiver 74 to receive the data communication from the data entry and scanner device 75. Other sources for short range communication may become available.

The data entry and scanner device 75 further includes a scanner head 77. The scanner head 77 show in FIG. 11 is deemed representative of any of a number of known types of scanners, such as wand types, laser types which may be used in accordance herewith. Preferably, the device 75 may include a keyboard 78, and a display 79. The keyboard 78 may be an alphanumeric keyboard and may be identical to the previously referred to keyboard 35. The display 79 desirably is an LCD display because of the low power requirements for that type of display. The display 79 typically might be functional to display numerals or characters in human-readable format of codes read by the scanner head. An operator may then verify the data prior to transmitting them to the respective data terminal device 39.

In case of an error in the data read by the scanner head 77, or in case of an inability of the scanner head 77 to recognize the codes representing the data to be read, an operator of the device 75 may correct, override or enter data into the device and verify their correctness from the display 79. Because the device 75 is a self contained unit, the keyboard 78, display 79 and the data entry and communication module 76 are operated by an on-board power source, such as a battery 40, which preferably may be rechargeable. The device is movable and usable within its functional communication range independently of the respective device 39. The use may be restricted to arm movement of an operator which the operator carries the device 39 on a belt, similar to the device 39 shown in FIG. 5, or the independent range of movement with respect to the corresponding device 39 may extend to a reasonable range of several feet, such as when the scanner is used away from a forklift truck and the device 39 is mounted on such truck.

Between uses the device 75 may be returned to a receptacle or holster 81 shown in FIG. 11 in phantom lines. The holster 81 may be mounted in a vehicle or may be carried on a person's belt 22. As a particular feature, the holster 81 is preferably provided with a battery pack of generally considerable power carrying capacity such as a rechargeable battery 26, also labeled "PWR", Terminals of the battery 26 may be coupled electrically through a base 83 to make contact through the holster 81 with external contacts 85 of the device 75. The contacts 85 are in turn coupled electrically to the rechargeable battery 40 of the device 75. Thus, during periods of non-use, the power source or battery 40 of the device 75 may be recharged. Such a provision for recharging the battery 40 permits the size of the battery 40, its weight and the size and total weight of the device 75 to remain comparatively small while extending the time of use of the device 75.

Figure 12:
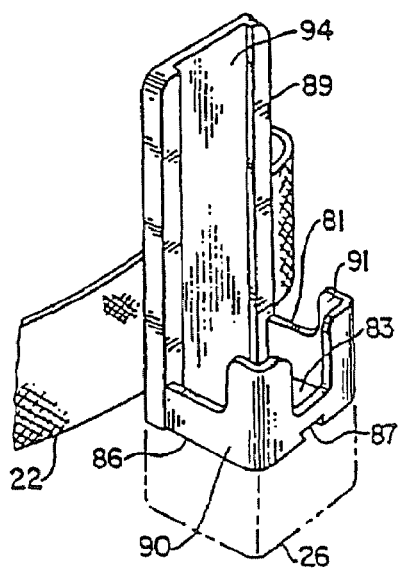
FIG. 12 is a pictorial representation of a receptacle for the data entry device shown in FIG. 11.

FIG. 12 shows somewhat simplified an pictorial illustration of a receptacle or holster 81 for the data entry and scanner device 75. The base 83 of the holster 81 is shown to contain on its underside 86 a retainer slot 87 as a representative means for releasably receiving the battery pack 26. A quick exchange of the battery pack 26 for a fully charged battery pack 26 further extends the usefulness of the device 75. An upright guide wall 89 cooperates with front guides 90 and 91 to form a seat or socket of the holster 81 for retaining the deice 75 during non-use. If the holster 81 is to be worn on a person's belt 22, the belt may be attached to an outer surface of the upright guide wall 89. A recess or depression 94 which may extend the entire length of an inner surface of the upright guide wall 89 would provide protection to the keys of the keyboard 78 and prevent accidental data entry or transmission when the device 75 is inserted into the holster. The described holster is merely given as an example of a receptacle for the described data entry and scanner device 75, to illustrate a convenient means for retaining the device 75 and for recharging the battery 40 during periods of non-use of the device.

Figure 13:
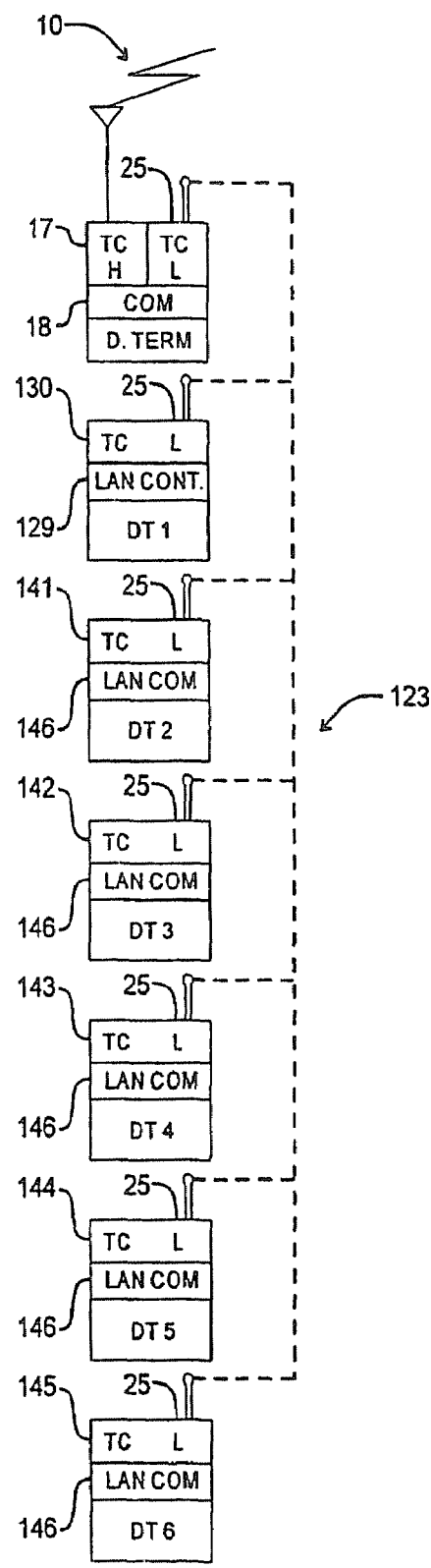
FIG. 13 is a schematic representation of another embodiment of the invention, showing components of the low power communication system communicatively coupled to operate independently of a relay device.

According to another particular embodiment, as described herein generally with respect to FIG. 13, a LAN communication procedure advantageously resides in a communication circuit 29 of a selected data terminal device 130 ("DT 1") of the low power data terminal devices ("DT 1" through "DT 6"). As described herein below, the LAN communication procedure preferably resides in a communication circuit 131, referred herein as "CONTROL BOARD", of a printer device 132 (see FIGS. 16 and 17). Other coupled data terminal devices of the system 123, identified as "DT 2" through "DT 6" are capable of communicating with the data terminal device 30 in the absence of the communication device 18. In the hierarchical system of FIG. 1, the low power transceiver 25 of the communication device 18, and, in essence the communication device 18 as such is part of the low power LAN. In the embodiment of FIG. 13 the communication device 18 is non essential and can be removed without disruption to the operation of the low power system 123.

In FIG. 13, each of data terminal devices 141 through 145 ("DT 2" through "DT 6") include the low power transceiver 25 ("TC L"), a predetermined communication function 146 ("COM") which includes an operating protocol for the respective device, and of course the respective device function itself which may differ for each of the devices and may combine in each a combination of the devices as described with respect to FIG. 1. The communication function is preferred to be a multifunction integrated circuit which may include programmable constant storage memory locations. Constants or values stored in the respective memory locations may be determinative of the operation of the respective device. For example, the scanner or data terminal device 141 may retain in its memory stored an address code which prefaces in each data communication the message of scanned data and determines which other data terminal receives the transmitted data message. The data message address code may be switched from one stored code to another according to a stored program of the communication function 146. A transmitted message of scanned data may be routed as a result of the switch to the data communication device 18 instead of to the LAN controller device 130. The LAN controller of the device 130 is contemplated to be housed with a portable or self-contained printer device. The communication circuit 129 in such case may include a certain data storage capacity which will permit the device 30 to receive and retain scanned bar codes. Whenever the data communication device 18 becomes coupled into the low power communication system 123 stored data from the printer device 130 are transferred via the relay link of the communication device 18 to the central data processing station 11, for example.

It is to be understood that within addressing limits of the protocol and transmission time allocations, each low power communication system 123 may include more of the data terminal devices than those shown as representative devices in FIGS. 1, 2, 13 or 14. A particular time share communication program may provide for 16, 64 or even 256 devices to become coupled to the same low power communication system 123. In the system 123 each of the devices may communicate either with the controlling device, such as the printer device 30, or with any of the other devices, shown as 141 through 145, as an example.

Figure 14:
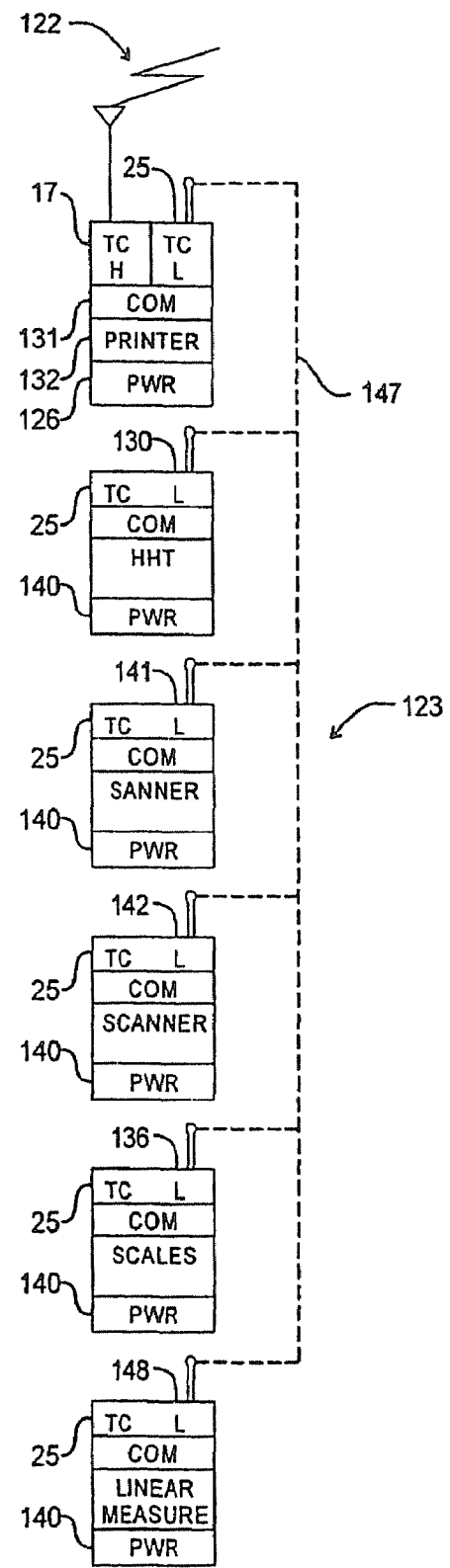
FIG. 14 is a schematic representation showing components according to the invention linked into a low power communication system, the components including weight measuring and linear measuring devices and code scanning devices communicatively interacting with a data collection terminal and a printer device.

FIG. 14 depicts schematically specific ones of the generally described devices that are particularly adapted to track containers and crates in shipping operations. As a general overview, the devices depicted in FIG. 14 include data input devices such as the scales 136 or as the scanner devices 141, 142, and data output and control devices including the printer 132 and the data collection terminal 130. According to FIG. 14, the printer device 132 is equipped with the already described self contained power source 126, a battery module of increased capacity and size. The printer device 132 includes in addition to the low power transceiver 25 a high power transceiver 17 for communication within the high level system 122, also referred to herein as "Wide Area Network" or "WAN". The communication circuit 131 includes, consequently, besides data storage for the communication protocol additional circuit elements for transferring data messages between the low level communication system 123 and the high level system 122 ("WAN"). The data terminal device 130 is preferably a hand-held or portable data collection terminal 130 as shown and described in greater detail below in reference to FIG. 18.

In the schematically depicted system 123 of FIG. 14, the printer device 132 is shown as being coupled via a low power RF link 147 to the scanner 141, a second scanner 142, the transceiver equipped weighing device or scales 136 and a transceiver equipped linear measuring device 148. The referred-to devices are basic data collection and recording devices for a highly automated freight transport system. Weight and linear measurement data on containers are collected and recorded in electronic binary data format. The interactions of the data collection terminal 130 with the printer device 132 and various of the data collection and recording devices or combinations of the devices coupled to a common low power transceiver 25 are particularly adapted to track containers in express shipping operations. At each operating station, such as a route pickup point, or a transfer point of articles in transit, the printer device 132 and the data terminal 130 operates in conjunction with other of the devices to create or update a shipping record that may be transmitted via the high power link 122 to the host computer 11 (see FIG. 1), or that may be used to accompany the articles in transit.

Particular for air freight, reasonably accurate weight and volume determinations play a significant role. For an air freight operation to function most efficiently, weight and volume determinations of shipping containers need to be made quickly and with reasonable accuracy. Thus, a freight or package pickup driver may estimate the size and the weight of containers received at one or more pickup points of a pickup route, however, to most efficiently and safely transport the freight via airplane to its destination, the actual weight and size of each container or package to be shipped by air freight must become known accurately within negligible tolerance levels. The devices needed for determining the weight and size of shipping containers to be picked up would be carried by the route operator to the pickup site at a customer's location, for example. In a state of the art system, the route driver may use a typical tape measure to obtain the dimensions of the shipping containers or packages to be picked up. The route drive may also either estimate the weight of each of the boxes when they are large, or simply verify the data provided by the customer. The weight of rather large shipping containers is, however, difficult to estimate.

Figure 15:
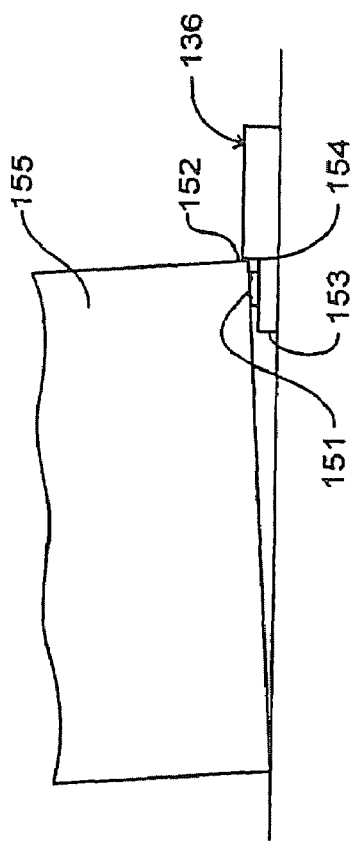
FIG. 15 is a somewhat schematic representation of a weight measuring device and a container disposed to be weighed thereby.

In reference to FIG. 15, a preferred embodiment of the scales 136 provides a weighing base or contact plate 151. The contact plate 151 is a sensor of a weigh cell disposed within the scales. The contact plate 151 is positioned adjacent a reference ledge 152. The reference ledge 152 extends above a base plane 153 in which the weighing contact 151, a transducer switch, is mounted. The transducer switch produces an analog signal corresponding to the weight or pressure exerted against the external contact plate 51 thereof. The analog signal is electronically calibrated to be representative of a weight on the contact plate 151. The analog signal is then converted to a binary digital signal and may be temporarily store within the scales 136. The digital signal is further modulated and is transmitted via the transceiver 25. To weigh a box of any size, the weight can be determined with reasonable accuracy when first one side and then the other side or the box are weighed and the two indicated weights are added. FIG. 15 shows the weight scales or weigh cell 136 disposed under a first edge 154 of a shipping container or box 155 which is shown in phantom lines. Since the box 155 is lifted along the first edge off the ground, its weight is supported by a second edge 156 against the ground and at its first edge 154 by the weighing contact 151. After weighing the first edge 154, the routed driver or operator simply removes the scales 136 from the first edge and places the scales 136 in a similar manner under the second edge 156. Even if the center of gravity of the box and its contents is packed closer to the one edge than the other, the two weight measurements when added provide with reasonable accuracy the actual weight of the box and its contents. A minor error resulting from the tilt of the box 155 amounts to no more than two percent of the measured weight for angles of tilt of the box 155 of less than ten degrees.

Figure 16:
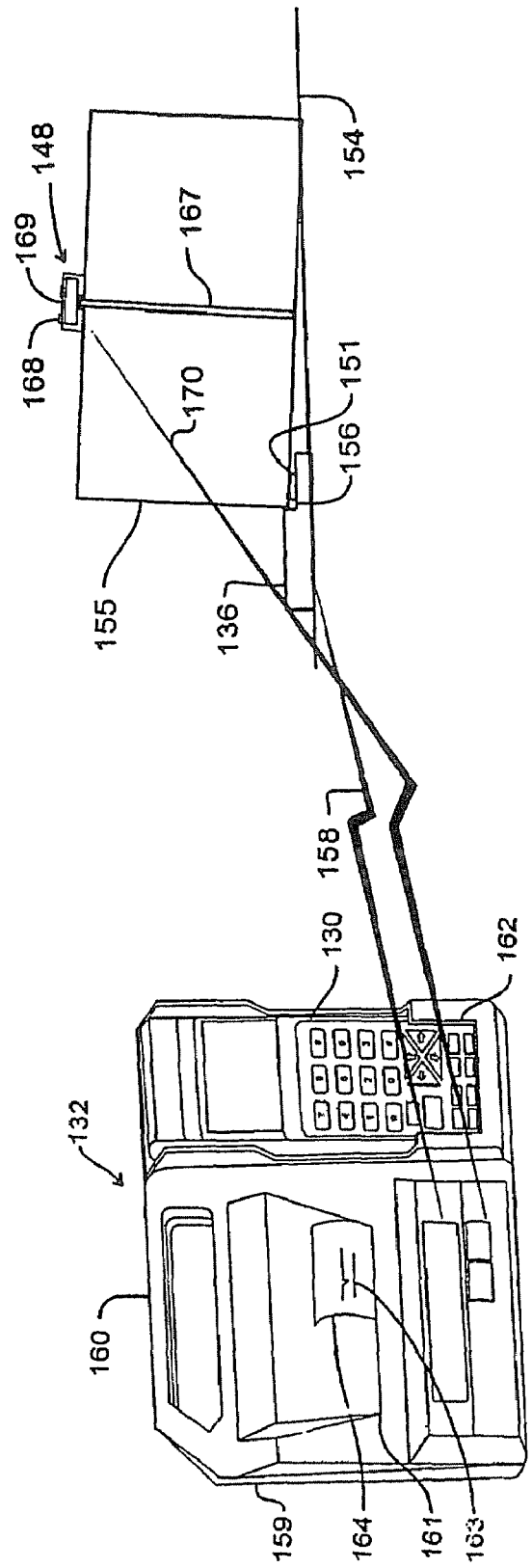
FIG. 16 is a somewhat schematic representation of a weight measuring device and of a linear measuring device, both devices being linked by a low power communication link to a printer device.

FIG. 16 shows the weigh cell or scales 136 disposed under the second, opposite edge 156 of the box 155. A communication link 158 is schematically indicated as transmitting the measured weight data in a data transmission message to the printer device 132. In the preferred example described herein, the printer device 132 is a hand-portable printer, the printer mechanism being disposed within a briefcase type housing 159 which also features a carrying handle 160. The housing 159 preferably has first and second housing cavities 161 and 162. The printer mechanism, shown only schematically by a printer head 163 adjacent a printed material 164, is disposed entirely within the first housing cavity 161. The second housing cavity 162 holds removably mounted therein the hand-held data collection terminal 130 ("HHT"). Reasons and advantages for removably "parking" the HHT 130 in the second housing cavity 162 will be best understood from a more detailed description of the HHT or data collection terminal 130 in reference to FIG. 18 below. According to the operation of the printer device 132 and the data collection terminal 130, temporarily inserting the data collection terminal 130 into the second housing cavity 162 of the printer housing 159 may selectively cause the low power transceiver 25 of the data collection terminal 130 to become deactivated. Communication of data between the printer device 132 and the data collection terminal 130 preferably occurs by hard coupled electrical data connections rather than by the low power RF communication between the respective transceivers 25 while the data collection terminal 130 remains in the housing cavity 162. Typically the data collection terminal 130 includes substantial memory circuits and microprocessor circuits for data processing. While the data collection terminal 130 remains coupled to the printer device 132, the microprocessor circuits may be utilized by the controlling printer device 132 in processing data received via the low power RF transmission links.

By temporarily placing the data collection terminal 130 into the second housing cavity 162 of the printer device 132 the route driver or operator has more freedom to collect shipping data of the articles to be shipped. The operator may need to lift the shipping containers or boxes 155 to weigh them and measure their dimensions. With the printer device 132 placed on the floor in the vicinity of the shipping containers 155, or mounted in the route vehicle outside the shipping area where the containers 155 are located, the operator is free to move about to obtain measurements and weights of the containers 155.

To obtain weight measurements of a number of shipping containers 155 at a warehouse location, the operator may simply weigh each of the containers at first and second opposite edges. After each set of two weight measurements the scales 136 would be cleared, the last two readings would be combined and the combined readings would be stored. The operator may identify the sequence of the boxes weighed by hand numbering the boxes 155 if a relatively large number of boxes 155 are to be picked up at a particular location.

After weighing each of the boxes 155, the operator may then proceed through the sequence of the same boxes 155 and obtain their linear measurements. For example, a selected algorithm may accept three consecutive measurements as the length, the width and the height of the box 155 being measured. FIG. 16 shows the linear measuring device 148 positioned to measure the height of the depicted box 155. The measuring device 148 may include an extendable string or tape 167 the extended length of which is measured and recorded by an electrical transducer, such as by an internal capstan (not shown). With the string or tape extending the length of the distance to be measured, the operator simply enters the measured dimension by pushing a button 168 of the device 148. The generated linear measurement may be in an analog output form, or is preferably a digital output generated by increments of rotation of the internal capstan, for example. An LCD screen 169 may give a visual confirmation of the dimension measured. The entry of the measured dimension on pushing the button 168 may record the measured dimension in a memory internally of the measuring device 148. In distinction over other linear measuring devices, the low power transceiver 25 of the linear measuring device 148 is coupled to read the stored measured dimension and transmits a data message corresponding to the value of the measured length to the printer device 132 via a communication link 170, thereby entering the measured value into the data system 123 without further action by the operator. The communication circuit 131 of the printer device 132 preferably contains a microprocessor circuit and associated memory, or, alternatively, computation logic circuit and memory circuits to process and store the received measurement data. Processing and storing the received data includes the sequencing of the data through programmed routines to automatically compute and store the total weight and the volume of each of the boxes 155 weighed and measured.

The order of the above weighing and measuring sequence for determining both weights and measurements of shipping containers 155 may of course be altered. It may be preferred, for example, to both weigh and measure one box 155 before proceeding to measure and weigh the next box 155. The preferred procedure may be programmed and is then followed. Alternative weighing and measuring procedures may be programmed and may be selected as preferred by an operator.

Figure 17:
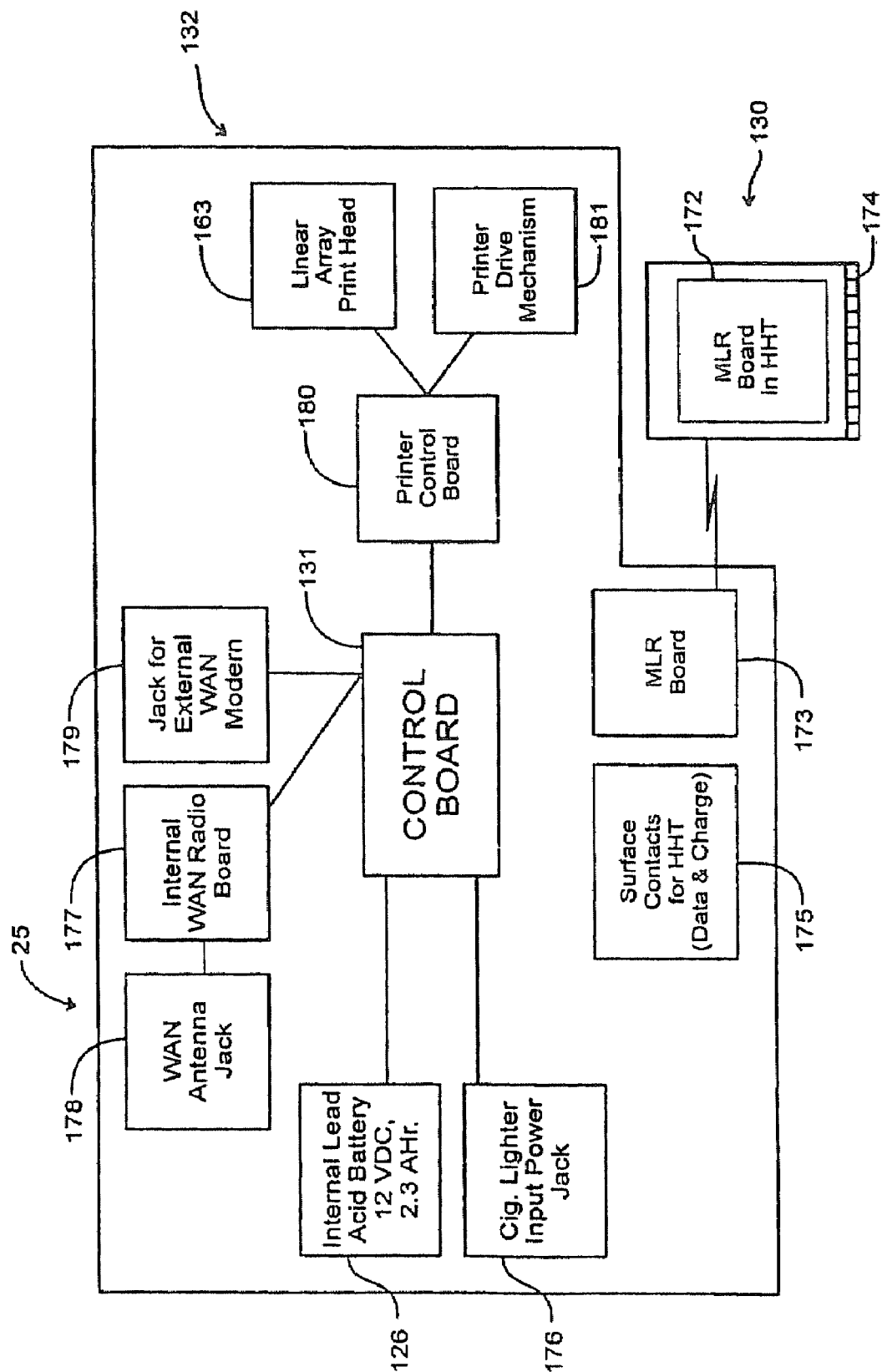
FIG. 17 is a schematic block diagram of major elements of the printer device shown in FIG. 16, and of their relationship to a control board of the printer device.

The block diagram of FIG. 17 depicts a functional interaction of the communication circuit 131 ("CONTROL BOARD") with other functional modules of the printer device 132 and the data collection terminal 130. The low power transceiver function is identified in each of the devices 130 and 132 by boards 172 and 173 ("MLR Board in HHT") and ("MLR Board"), respectively, wherein the acronym "MLR" denotes the term "micro-link radio" as an equivalent to the described low power communication link. The data collection terminal 130 also shows schematically a plurality of external contacts 174 which connect to comparable contacts within the second housing cavity 162 of the printer device 132. The corresponding printer contacts 175 are represented in FIG. 17 by the function block 175 ("Surface Contacts for HHT"). As indicated by the respective function block 175, the electrical connection established by the contacts is for data communication and includes power terminals which electrically couple the data collection terminal 130 to the printer device 132.

The power input to the communication circuit 131 is by a high capacity battery 126, which in a preferred embodiment may be a lead acid battery 126 ("Internal Lead Acid Battery"), such as a 12 volt, 2.3 ampere-hour battery. As an alternate external power source, a cigarette lighter input jack 176 ("Cig. Lighter Input Power Jack") may be used to couple power from the cigarette lighter outlet socket of the route vehicle (not shown) to the printer device 132. The high capacity battery 126 or, alternatively, the external power from the route vehicle provide power to both the printer device and its functions and to the hand-held data collection terminal 132 when the data collection terminal 132 is inserted into the second housing cavity 162 of the printer housing 159.

FIG. 14 depicts the printer device 132 as including the high power transceiver 17. FIG. 17 shows the transceiver 17 to be an alternative as represented by function boxes 177 and 178

("Internal WAN Radio Board") and ("WAN Antenna Jack"), respectively. A jack 179 for an external WAN modem may be preferred when instead of the described high power RF system 122, communication to a host computer 11 is to proceed over standard switched telephone communication lines. As a further modification, provisions for both types of data transfer via Wide Area Network communications may be disposed within the printer device 132. A printer control board 180 ("Printer Control Board") is shown as controlling both the linear array print head 163 and a printer drive mechanism 181 including line feed or print media advance. Print media are labels for bar code printing, shown at 164 in FIG. 16, to be attached to shipping containers. Print media may also include customer order acknowledgment forms and typical shippers in human readable format.

The printer device 132 may be advantageously used by a route driver to "advance" information to a first transfer point of the shipping route of containers 155 having been loaded onto the route vehicle. The first transfer point typically is a local warehouse or "hub" at which to which the route vehicles return at the end of their respective routes. At the hub, the containers 155 would typically be unloaded and sorted. The applied bar code labels or similar machine readable identification allow quick identification of the containers 155 and correlation of the container with the shipping data previously transmitted by the driver to the hub.

Figure 18:
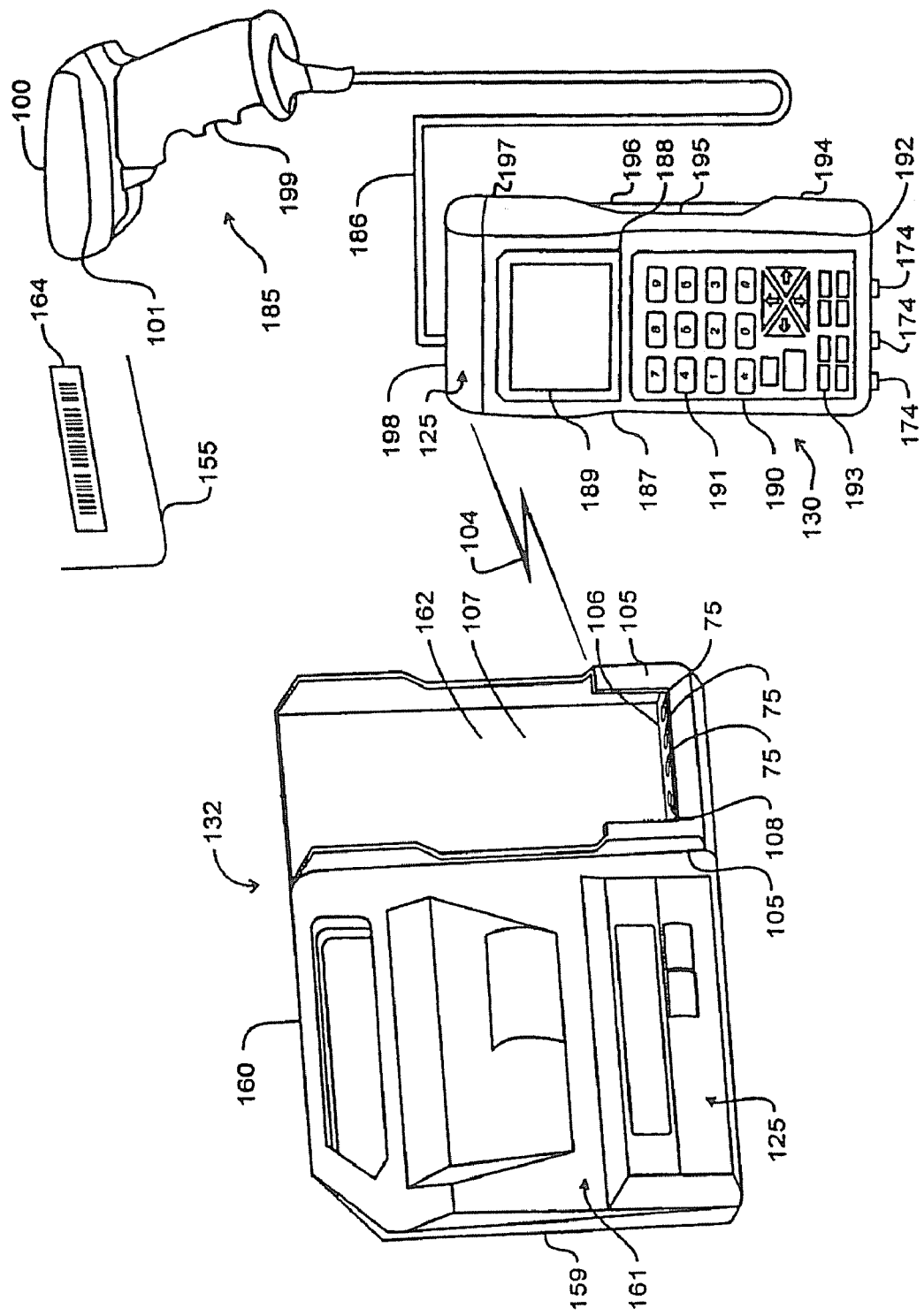
FIG. 18 is a simplified pictorial representation of a low power data link communicatively coupling a data collection terminal and a printer device.

FIG. 18 shows the printer device 132 and the data collection terminal 130 in an alternate embodiment wherein a hand-held bar code reader or scanner 185 is electrically coupled by a data cable 186 to the hand-held data collection terminal 130. The data collection terminal 130 is in its overall structure a typical hand-held data terminal similar to commercially available models, such as those presently marketed by the assignee of the present application. Such terminals have an elongate housing 187 and feature on a front side 188 an LCD screen 189 for displaying typically alpha-numeric data. A keyboard 190 differs from standard keyboards by a new positioning of numeric keys 191 directly adjacent and below the screen 189. Typical keyboard arrangements provide for the more frequently used numeric keys 191 to be positioned adjacent a base end 192 of the housing and to position function keys 193 adjacent the LCD screen 189. The hand-held data collection terminal features on its rear side 194 of the housing 187 a well accepted recessed hand grip configuration 195 and an elastic hand strap 196 which is attached adjacent the base end 192 of the housing 187 and near a top end 197 thereof, stretching spacedly across the recessed hand grip configuration 195.

Typical placement of numeric keys toward the base end of the data collection terminal 130 is apparently founded on the frequent use of the numeric keys. As an operator of the data collection terminal typically holds the terminal in a manner that the base end 192 points toward the operator, the most used numeric keys would be located closest to the operator and be as such most accessible. It has been found that operators of the hand-held data collection terminal tend to tire more readily however, when the numeric keys are disposed closest to the base end 192 of the housing, while a positioning of the numeric keys 191 next to and directly below the display screen 189 produced a comparatively less tiring use of the hand-held data collection terminal 130. As a result, the reversal of the numeric keys 191 and function keys 193 from their typical arrangement is considered one of the advantageous improvements in the described hand-held data collection terminal 130. The hand-held data collection terminal 130 further includes at its top end an end cap housing 198 wherein the low power transceiver 25, also referred to as micro link radio transceiver 25, is located. The end cap housing 198 may include a typical data connector plug (not shown) for removably coupling the cable 186 of the scanner 185 directly to the end cap housing 198. An internal continuation of the data cable 186 is routed through the end cap housing and coupled to an internal data bus of the data collection terminal 130.

The scanner 185 preferably has a pistol grip type handle 199 and a scanning head 100, having a scanning window across a front face 101 through which a bar code label 164, shown in phantom lines, attached to a shipping container 155 may be read. The data collection terminal 130 typically includes microprocessor circuits including associated memory circuits for initially processing data received by bar code scanning. The initially processed data may then be transmitted by a low power RF link 104 to the printer device 132. The printer device 132 may either store the received information for batch transfer to the host computer 11 at a later time, or may establish in accordance with the above described high power radio provisions as implemented through the boards 177 and 178 a link to the high power communication system 122, or through the modem board 179 a telephone link, to communicate the data to the host computer 11 on a real time basis.

The second housing cavity 162 forms a receptacle 162 for the data collection terminal 130. Flanged side walls 105 guide and temporarily hold the data collection terminal 130 when it is longitudinally inserted into a receptacle or socket 106 formed by the side walls 105 in combination with a closed back 107. A base end 108 of the socket 106 holds a plurality of the spaced surface contacts 175 which engage correspondingly spaced surface contacts 174 on the base end 192 of the data collection terminal 130 when the data collection terminal 130 is inserted into the socket 106 of the printer housing 159. The matching contact elements 174 and 175 couple the data collection terminal 130 to the printer both electrically and for data communication purposes. Thus, upon insertion of the data collection terminal 130 into the socket 106 a signal establishing the direct data link between the printer device 132 and the data collection terminal 130 may be used in the preferred system to log off the data collection terminal 130 from the low power communication system 123 and to reroute messages addressed to the data collection terminal 130, such as from the scanners 141 or 142 directly to the printer device 132. The printer device 132 through typical microprocessor circuitry in the control board 131 may route received scanned data messages from the scanners 141 or 142 (or more scanners if conveniently coupled into the low power LAN 123) to the data collection terminal 130 via data contacts of the coupled contacts 174 and 175, in further reference to FIGS. 14, 17 as well as 18 and 19.

Thus as shown in FIG. 16, with the data collection terminal 130 being inserted into the printer device 132 as described, data communication exists directly between the linear measuring device 148 and the printer device 132. The control board may 131 may cause the data collected by the linear measure 148 to be displayed on the screen of the data collection terminal 130. In a similar manner, the scales 136 communicate directly with the printer 132. The protocol may provide, however, that the data collection terminal may be used as an alternate data receiving device even when the data collection terminal 130 is temporarily disposed within the socket 106 of the printer device 132.

The arrangement of the printer device 132, and the data collection terminal 130 with an attached data scanner as shown in FIG. 18 may be preferred in a delivery route operation. The printer device 132 is then preferably disposed in the cab of the delivery vehicle or truck, and the driver or operator of the data collection terminal may carry the data collection terminal 130 in a belt holster (not shown). The operator uses the scanner 185 to verify the package or container 155 to be delivered by reading the bar code 164 on the container 155 and by verifying immediately the information on the screen 189 of the data collection terminal 130. However, only a few containers 155 may need to be selected and verified at a single stop along the delivery route, such that carrying the data collection terminal 130 about for a short time is not an impediment and improves the process of verifying the correctness of the delivery. The selection of the container or containers 155 may further be improved when the operator enters delivery point information into the data collection terminal and requests the data terminal to verify the correspondence of the selected containers 155 with those to be delivered at a certain stop. When the bar code of a container 155 is read, the data collection terminal 130 compares the information on the bar code with the requested address information to verify the correctness. An audible alarm on the data collection terminal 130 may then indicate to the operator whether the information on the bar code corresponds to the desired container 155. The operator may consequently search for containers under normally insufficient lighting conditions, as may exist in the back of the delivery vehicle, without reference to the screen 189. The audible signal indicates the correctness of the selection. The verified container information is transferred by the established low power communication link 104 to the printer and a shipping receipt to be signed by the receiver of the freight delivery is printed by the printer device 132 as soon as the selection process is completed.

The embodiment of FIG. 18 may, however, not be an optimum solution when it is desired to scan an comparatively large number of labels associated with a correspondingly large number of shipping containers. The cable-attached scanner 185 is advantageously removed and replaced by a scanner, such as the scanner 141 or 142, which communicates via the low power LAN system 123. Such may be the case when an aircraft or other vehicle with a large number of shipped packages and containers arrives at an intermediate shipping point, and the packages and containers need to be identified and re-distributed and re-routed to various destinations within a critically short time span. It may be desirable at that time to operate with a plurality of scanners, and providing a system by which the operator sorting out the containers is least impeded with the weight or size of hand-held data collection terminals.

Figure 19:
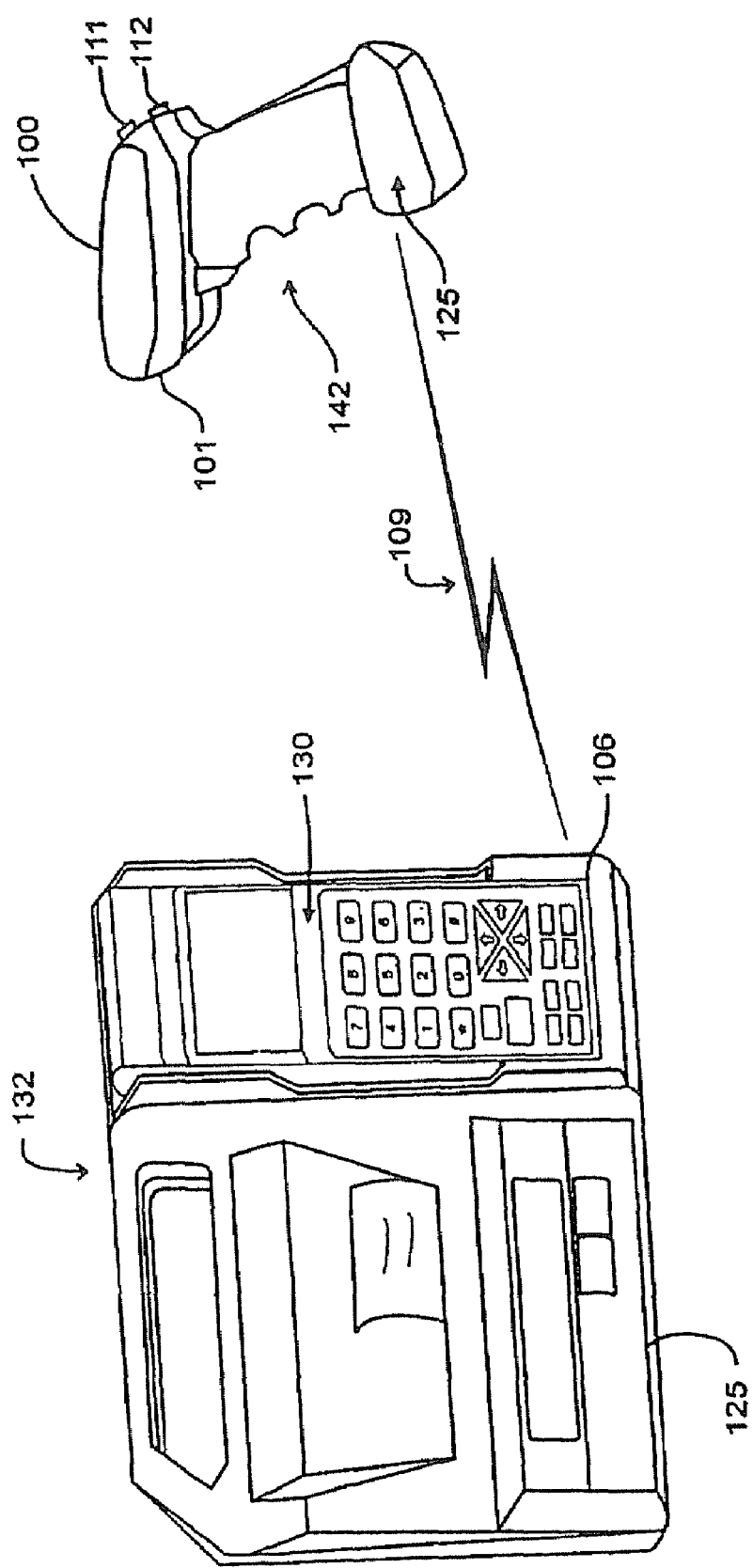
FIG. 19 is a simplified pictorial representation of a printer device, a data collection terminal and a scanner device coupled by a low power communication link.

FIG. 19 depicts a respective use of the data collection terminal 130 in combination with the printer device 132 which may be preferred at a site at which the containers 155 are sorted and re-routed, hence transferred. The data collection terminal 130 is inserted into the socket 106 of the printer device 132. A plurality of scanner devices, representatively portrayed by the single hand-held scanner 142, may be logged on to the low power communication system 123, as schematically indicated by a link 109. Each of the scanners 142 is individually identified by a designated address code and becomes interactively linked to communicate data messages to the printer device. Thus, the control board 131 of the printer device 132 (which may interact directly with the data processing circuits of the data collection terminal 130) identifies the source of each of the scanned data messages as they are received by the low power transceiver 25 in the printer device 132. Since the scanner device 142 is a data input device, communicating data messages of scanned information into the system 123, the need for an RF receiver in the scanner may not be deemed necessary. However, within the system 123 as described herein, the transceiver 25 of the scanner device 142 receives codes which may trigger it to transmit information during designated time slots, thereby permitting time slot multiplexing of the plurality of scanner devices 141 and 142 as contemplated herein. It is further desirable to communicate to each of the scanner operators information as to the result of each scan based on data stored at the data collection terminal, within the printer control board 131 or even at the host computer 11.

As is known with respect to typical hand scanners of bar codes, the scanner units may have indicator lamps which indicate when a scan has successfully identified the information of the label. An audible as well as a visual indication is given, typically by color differentiated indicator lights, such as indicator lights 111 and 112. In operation, each of the scanners 142 reads a bar code. The scanner head 100 reads the bar code data through the typical window 101. The scanned information is transmitted via the low power transceiver 25, which may be disposed conveniently at a lower end of the handle 199. A transmitted data message of raw data would be received by the corresponding receiver section of the transceiver 25 at the printer device 132. The printer device 132 causes the received data message to be interpreted and then transmits to the respective scanner a data message acknowledging the receipt of the scan and whether the data found a match with a desired category containers. The match may be indicated by an audible signal at the scanner 142 or by a light signal of a combination of the indicator lights 111 and 112, as an example. Of interest to the desired sequence of events is the return of a data message to the scanner indicating to its operator the result of the scan, the result having been arrived at a point remote from the scanner device 142 itself.

An example of an application of the described embodiment demonstrates certain advantages of the use of a plurality of the scanners, such as scanners 141 and 142, and the direct coupling of the data collection terminal 130 to the printer device 132. A shipment of a great number of packages or containers 155 is, accordingly, received at a shipping node for redistribution and further shipment by ten distinct outgoing routes, as an example. The objective at the node is to correctly direct each of the received packages 155 to one of the ten outgoing routes. Accordingly, ten scanners 142 may be linked to the printer device 132. The data terminal 130 or the control board of the printer device 132 contains all shipping information for each of the packages that should have arrived by and should be part of the received shipment. Each one of the ten scanners 142 is assigned to scan for and select packages for only one designated one of the ten outgoing routes. Thus, as the packages are sequentially advanced, such as on a conveyor (not shown) past ten distribution points corresponding to the ten outgoing routes, each operator scans the passing packages. When one of the scanned bar code labels of the passing packages indicates a match with that of the outgoing route, the operator removes the package from advancing further to the next station. Because each of the scanners 142 is individually logged into the low power communication system and can be uniquely addressed by the function of the control board 131 of the printer device 132, each of the scanners 142 is capable of functioning in the described manner to select only those packages that are destined to be routed via the predetermined outgoing route. The lack of dangling data or power cords in the vicinity of package advancing mechanisms, such as moving conveyor belts or conveyor rolls contribute to the safety of the operators, preventing accidental entanglement of the operator with the dangling data or power cords and with the moving conveyor mechanism.

In the described distribution process, one of the data collection terminals 130 may accompany each of the shipments, the shipping data may be transferred at the conclusion of the selection process to a respective one of the data collection terminals 130 to accompany the newly assembled shipment to the next distribution point or delivery route truck for individual distribution. The data collected may also be transferred either in the referred to batch process or by real time transmission from the printer device 132 to the host computer 11 for billing and bookkeeping purposes, Summarizing the described improvements and advantageous procedures, packages or containers 155 may be collected, shipped, redistributed and delivered in accordance herewith by measuring and weighing the containers 155 as described with respect to FIG. 16. Weight and size measurement data is transferred by the described low power micro link radio of the data communication system 123 to a printer device 132. The printer device 132 may transfer the received measurement data to the data collection terminal 130 with is temporarily inserted into a socket 106 of the printer device 132. The printer device 132 at that time also prints bar code labels which the route driver or operator attaches to the respective containers 155. The containers are then picked up by a route vehicle and the information regarding the accepted containers 155 is transmitted by batch transfer or on a real time basis in accordance herewith to the central host computer 11. The host computer may redistribute the shipping information by telephone communication links to respective redistribution points along the intended shipping route of each of the containers. In this manner each of the distribution nodes receives advance information as to the size, number and weight of packages in incoming shipments and in outgoing shipments after redistribution.

Advance notice as to the volume and total weight to be transported along a certain route permits the allocation of personnel or equipment to serve the need, should there be a variance from a certain normal volume or weight. Data collection terminals 130 may be logged on together with more than one printer device 132 according to needs at the referred to distribution nodes to process the incoming shipments as described above.

Because of the short effective range of the low power data communication system 123, the low power data system is well suited for route delivery and pickup operations, since a comparatively large number of individual operators can simultaneously cover various adjacent zones of a city or similar adjacent delivery areas without receiving interference from each others operations. The low power communication system 123 has been described particularly with respect to an RF communication system. Such low power systems may operate for example in a CB band frequency or in frequency bands allocated to transmission systems for garage door openers. An example of an operating band may be the 27 MHz band. It is, of course, within the scope of the invention that low power or short range signals other than RF transmissions be used. Infra red light transmission may, for example, be a substitute for low power RF communications.

Various other changes and modifications in the structure or operation of the described embodiment are possible without departing from the spirit and scope of the invention as set forth in the claims.

What is claimed is:

1. A network device for operating in a communication system that includes a first radio network and a second radio network having a shorter range than the first radio network, the network device comprising:

a first radio unit configured to communicate with the first radio network; and a second radio unit configured to communicate with the second radio network;

wherein the network device is operable to manage communications of a second network device participating on the second radio network.

2. The network device of claim 1 wherein the network device is operable to synchronize communications of the second network device participating on the second radio network.

3. The network device of claim 1 wherein the network device is operable to manage communications of the second network device with the first radio network.

4. The network device of claim 1 wherein the network device is operable to facilitate communications of the second network device with the first radio network.

5. The network device of claim 1 wherein the network device is operable to manage communications of the second network device with a third network device participating on the second radio network.

6. The network device of claim 1 wherein the network device is operable to serve as a master device on the second radio network.

7. The network device of claim 1 further comprising a processor configured to control the communications of the first radio unit with the first radio network and the communications of the second radio unit with the second radio network.

8. The network device of claim 1 wherein the network device is a mobile device.

9. The network device of claim 1 wherein the network device is a handheld device configured to be operated while being held in a hand of a user.

10. The network device of claim 1 wherein the network device is portable.

11. The network device of claim 1, further comprising a keyboard.

12. The network device of claim 1, further comprising a graphical display.

13. The network device of claim 1 wherein the first radio unit is configured to communicate with the first radio network according to a first communication protocol and the second radio unit is configured to communicate with the second radio network according to a second communication protocol independent of the first communication protocol.

14. The network device of claim 1 wherein the first radio unit is configured to communicate with the first radio network using a first operating band and the second radio unit is configured to communicate with the second radio network using a second operating band different than the first operating band.

15. The network device of claim 1 wherein the network device is an integrated circuit.

16. A network device for operating in a communication system that includes a first radio network and a second radio network having a shorter range than the first radio network, the network device comprising:

transmit circuitry configured to transmit signals on the first radio network and to transmit signals on the second radio network; and receive circuitry configured to receive signals from the first radio network and to receive signals from the second radio network;

wherein the network device is operable to manage communications of a second network device participating on the second radio network.

17. The network device of claim 16 wherein the transmit circuitry comprises first transmit circuitry configured to transmit signals on the first network and second transmit circuitry configured to transmit signals on the second radio network, and wherein the receiver circuitry comprises first receive circuitry configured to receive signals from the first radio network and second receive circuitry configured to receive radio signals from the second radio network.

18. The network device of claim 16 further comprising a processor operable to control the communications of the transmit circuitry and the receive circuitry with the second radio network.

19. The network device of claim 18 wherein the processor is operable to control the communications of the transmit circuitry and the receive circuitry with the first radio network.

20. The network device of claim 16 wherein the network device is a mobile device.

21. The network device of claim 16 wherein the network device is configured to communicate with the first radio network according to a first communication protocol and to communicate with the second radio network according to a second communication protocol independent of the first communication protocol.

22. The network device of claim 16 wherein the network device is configured to communicate with the first radio network using a first operating band and to communicate with the second radio network using a second operating band different than the first operating band.

23. The network device of claim 16 wherein the network device is a handheld device configured to be operated while being held in a hand of a user.

24. The network device of claim 16 wherein the network device is portable.

25. The network device of claim 16, further comprising a keyboard.

26. The network device of claim 16, further comprising a graphical display.

27. The network device of claim 16 wherein the network device is operable to synchronize communications of the second network device participating on the second radio network.

28. The network device of claim 16 wherein the network device is operable to manage communications of the second network device with the first radio network.

29. The network device of claim 16 wherein the network device is operable to facilitate communications of the second network device with the first radio network.

30. The network device of claim 16 wherein the network device is operable to manage communications of the second network device with a third network device participating on the second radio network.

31. The network device of claim 16 wherein the network device is an integrated circuit.

32. A transceiver for use in a wireless network device that operates in a communication system that includes a radio network, the transceiver comprising:
a radio unit configured to communicate with the radio network;
wherein the transceiver is operable to enable the wireless network device to manage communications of a second wireless network device participating on the radio network.

33. The transceiver of claim 32 wherein the communication system further comprises a main communication network and wherein the transceiver is capable of communicating with the main communication network.

34. The transceiver of claim 33 further comprising a processor operable to control the communications of the radio unit with the radio network and capable of communicating with the main communication network, 35. The transceiver of claim 33 wherein the main communication network comprises a wired communication network.

36. The transceiver of claim 33 wherein the main communication network comprises a wireless communication network.

37. The transceiver of claim 36 wherein the transceiver enables the wireless network device to manage communications of the second wireless network device with the wireless communication network.

38. The transceiver of claim 36 wherein the transceiver enables the wireless network device to facilitate communications of the second wireless network device with the wireless communication network.

39. The transceiver of claim 32 wherein the transceiver comprises an integrated circuit.

40. The transceiver of claim 32 wherein the wireless network device is sized to be held by a user.

41. The transceiver of claim 32 wherein the transceiver enables the wireless network device to synchronize communications of the second wireless network device participating on the radio network.

42. The transceiver of claim 32 wherein the transceiver enables the wireless network device to manage communications of the second wireless network device with a third wireless network device participating on the radio network.

43. A wireless communication device for operating in a communication system that includes first and second wireless networks, the device comprising:
transmit circuitry configured to transmit signals on the first wireless network according to a first communication protocol and to transmit signals on the second wireless network according to a second communication protocol independent of the first communication protocol; and
receive circuitry configured to receive signals from the first wireless network according to the first communication protocol and to receive signals from the second wireless network according to the second communication protocol.

44. The device of claim 43 wherein the first wireless network has a longer range than the second wireless network.

45. The device of claim 43 wherein the transmit circuitry is configured to transmit signals on the first wireless network using a first operating band and to transmit signals on the second wireless network using a second operating band different than the first operating band, and wherein the receive circuitry is configured to receive signals in the first operating band from the first wireless network and to receive signals in the second operating band from the second wireless network.

46. The device of claim 43 wherein the transmit circuitry comprises first transmit circuitry configured to transmit signals on the first network according to the first communication protocol and second transmit circuitry configured to transmit signals on the second network according to the second communication protocol, and wherein the receiver circuitry comprises first receive circuitry configured to receive signals from the first radio network according to the first communication protocol and second receive circuitry configured to receive signals from the second network according to the second communication protocol.

47. The device of claim 46 wherein the first transmit circuitry is configured to transmit signals on the first wireless network using a first operating band and the second transmit circuitry is configured to transmit signals on the second wireless network using a second operating band different than the first operating band, and wherein the first receive circuitry is configured to receive signals in the first operating band from the first wireless network and the second receive circuitry is configured to receive signals in the second operating band from the second wireless network.

48. The device of claim 43 further comprising a processor operable to control the communications of the transmit circuitry with the first and second networks and to control the communications of the receive circuitry with the first and second networks.

49. The device of claim 43 wherein the device is a mobile device.

50. The device of claim 43 wherein the device is a handheld device configured to be operated while being held in a hand of a user.

51. The device of claim 43 wherein the device is portable.

52. The device of claim 43, further comprising a keyboard.

53. The device of claim 43, further comprising a graphical display.

54. The device of claim 43 wherein the device is an integrated circuit.

55. The device of claim 43 wherein the device comprises a PCMCIA card containing the transmit circuitry and the receive circuitry.

56. The device of claim 43 wherein the transmit circuitry is configured to transmit spread spectrum signals on the second wireless network and the receive circuitry is configured to receive spread spectrum signals from the second wireless service.

57. The device of claim 43 wherein the transmit circuitry is configured to transmit spread spectrum signals on the first wireless network utilizing a first spreading code and to transmit spread spectrum signals on the second wireless network utilizing a second spreading code and wherein the receive circuitry is configured to receive spread spectrum signals from the first wireless network utilizing the first spreading code and to receive spread spectrum signals from the second wireless network utilizing a second spreading code.

* * * * *